(12) United States Patent
Hayashi et al.

(10) Patent No.: US 7,773,682 B2
(45) Date of Patent: Aug. 10, 2010

(54) OFDM RECEPTION APPARATUS AND OFDM RECEPTION METHOD

(75) Inventors: Takaya Hayashi, Kyoto (JP); Tomohiko Taniguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 856 days.

(21) Appl. No.: 11/596,045

(22) PCT Filed: May 11, 2005

(86) PCT No.: PCT/JP2005/008615

§ 371 (c)(1),
(2), (4) Date: Nov. 9, 2006

(87) PCT Pub. No.: WO2005/109713

PCT Pub. Date: Nov. 17, 2005

(65) Prior Publication Data

US 2007/0230329 A1    Oct. 4, 2007

(30) Foreign Application Priority Data

May 11, 2004    (JP) ............................. 2004-141554

(51) Int. Cl.
*H04L 27/28* (2006.01)
(52) U.S. Cl. ...................................... 375/260; 375/340
(58) Field of Classification Search ................. 375/260, 375/316, 340
See application file for complete search history.

(56) References Cited

U.S. PATENT DOCUMENTS 6,804,309 B1 * 10/2004 Morelos-Zaragoza ....... 375/316

| | | | |
|---|---|---|---|
| 6,879,626 B1 | 4/2005 | Sudo | |
| 6,956,812 B2 * | 10/2005 | Okada et al. | ................. 370/208 |
| 7,020,459 B2 | 3/2006 | Nagayasu | |

(Continued)

FOREIGN PATENT DOCUMENTS

CN    1401177 A    3/2003

(Continued)

OTHER PUBLICATIONS

Japanese Office Action, with English Translation, issued in Japanese Patent Application No. 2006-513042, dated on Feb. 12, 2008.

(Continued)

*Primary Examiner*—Shuwang Liu
*Assistant Examiner*—David Huang
(74) *Attorney, Agent, or Firm*—McDermott Will & Emery LLP

(57) ABSTRACT

A time from the start of a reception operation to the output of video, audio or the like is shortened. An OFDM reception apparatus is provided for receiving an OFDM signal composed of a plurality of carriers, comprising a fast Fourier transform section for converting a received time-domain OFDM signal into a frequency-domain OFDM signal, an equalization section for performing waveform equalization with respect to the frequency-domain OFDM signal, and outputting the waveform-equalized OFDM signal, and a modulation scheme estimating section for estimating a modulation scheme for a plurality of carriers constituting the waveform-equalized OFDM signal based on signal points of the plurality of carriers, and outputting an obtained estimation result. The OFDM reception apparatus performs a process for obtaining transmitted information with respect to the received OFDM signal, depending on the estimation result.

14 Claims, 26 Drawing Sheets

U.S. PATENT DOCUMENTS

| | | | |
|---|---|---|---|
| 2002/0041639 A1 | 4/2002 | Krupezevic et al. | |
| 2003/0123582 A1* | 7/2003 | Kim et al. | 375/347 |

FOREIGN PATENT DOCUMENTS

| | | |
|---|---|---|
| CN | 1144404 C | 3/2004 |
| EP | 1 052 821 A | 11/2000 |
| EP | 1 248 427 A | 10/2002 |
| JP | 2001-292121 A | 10/2001 |
| JP | 2001-313628 | 11/2001 |
| JP | 2001-320345 | 11/2001 |
| JP | 2002-9732 A | 1/2002 |
| JP | 2002-026860 | 1/2002 |
| JP | 2002-64571 A | 2/2002 |
| JP | 2003-060611 | 2/2003 |
| JP | 2003-101602 | 4/2003 |
| JP | 2003-143243 A | 5/2003 |

OTHER PUBLICATIONS

Chinese Office Action issued in Chinese Patent Application No. CN 2005800146746 dated Sep. 4, 2009.

* cited by examiner

FIG. 8
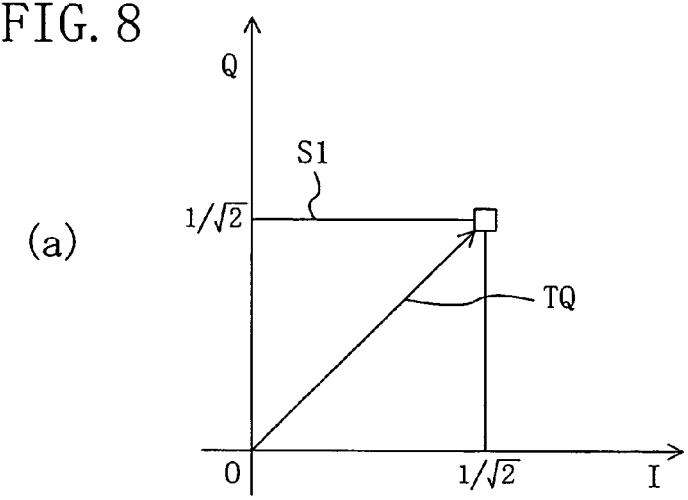
(a)
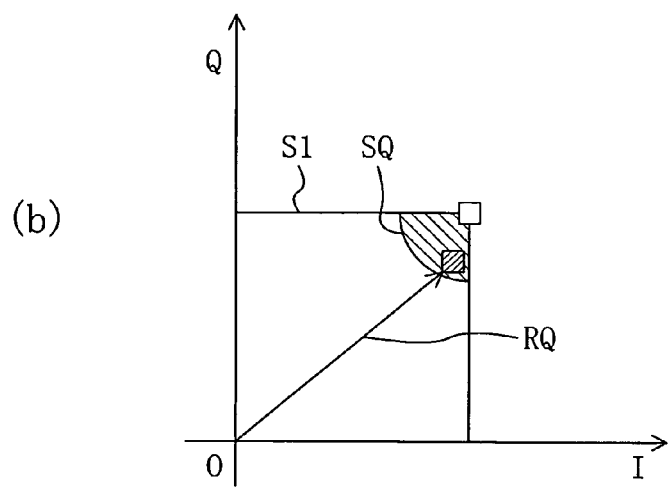
(b)
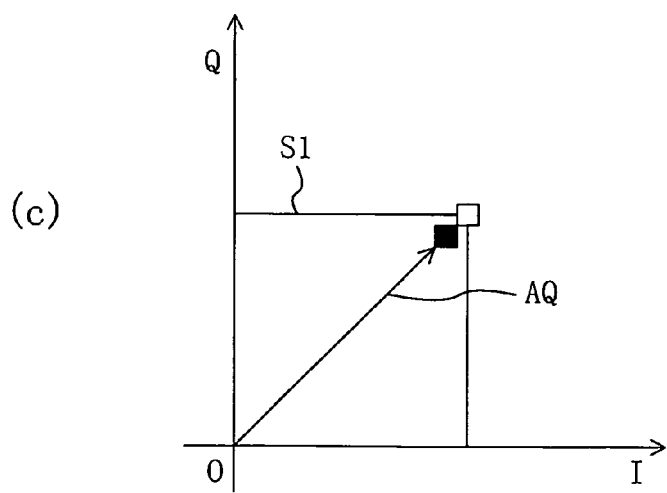
(c)

FIG. 9
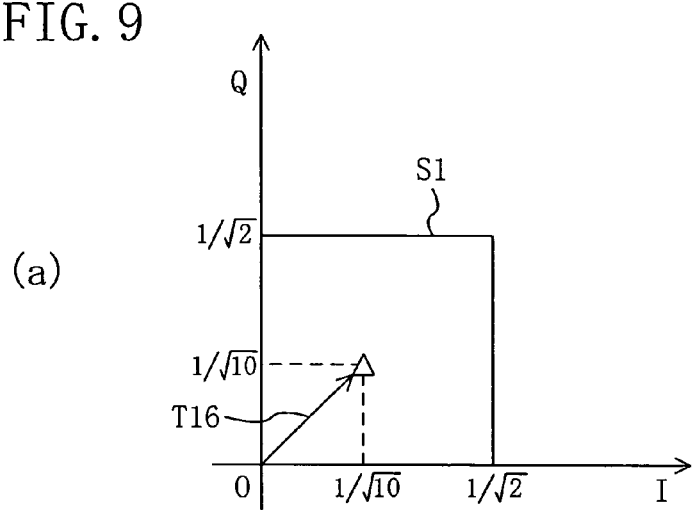
(a)
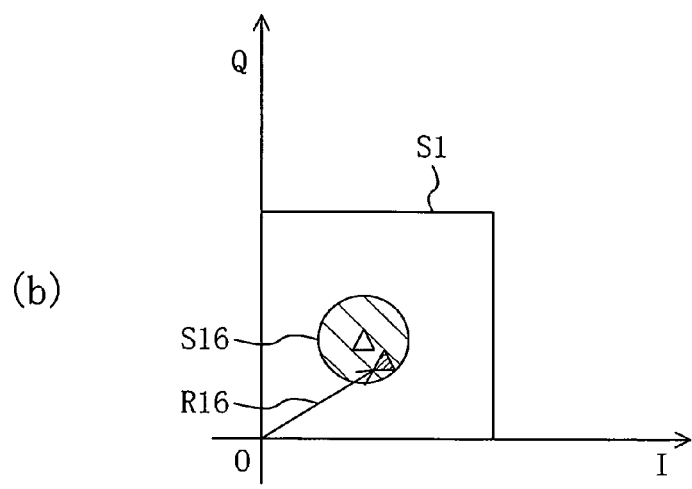
(b)
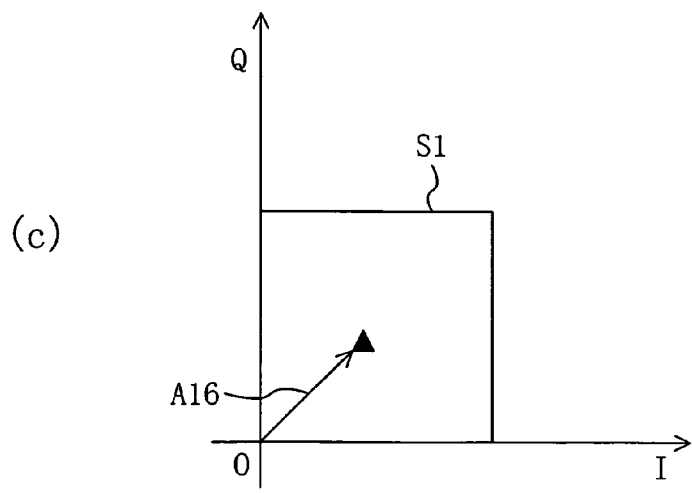
(c)

FIG. 10
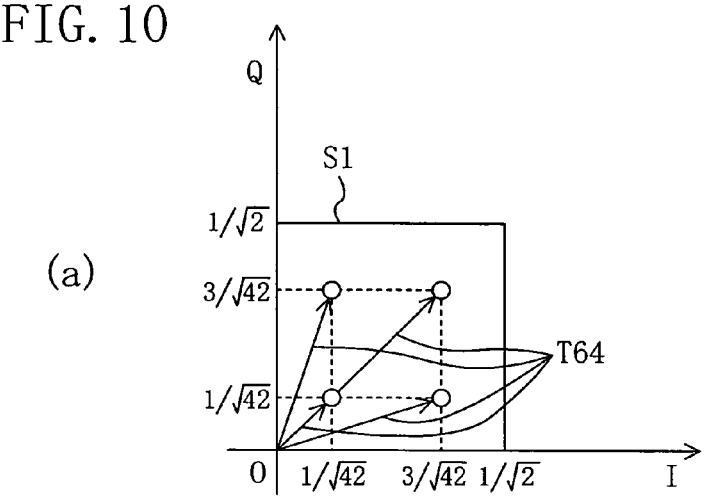
(a)
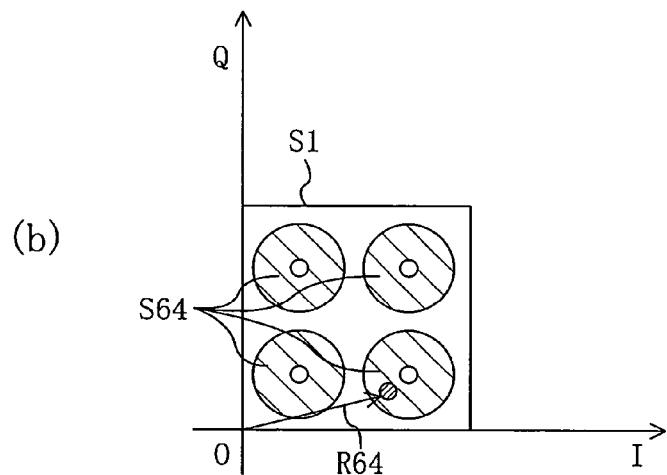
(b)
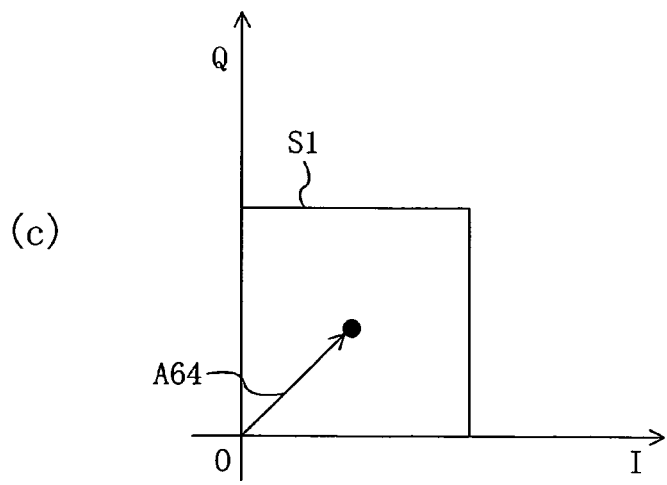
(c)

FIG. 12
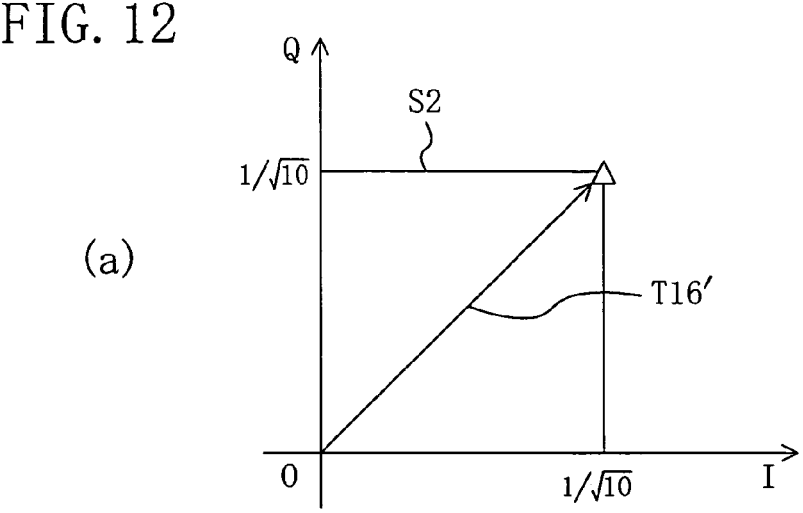
(a)
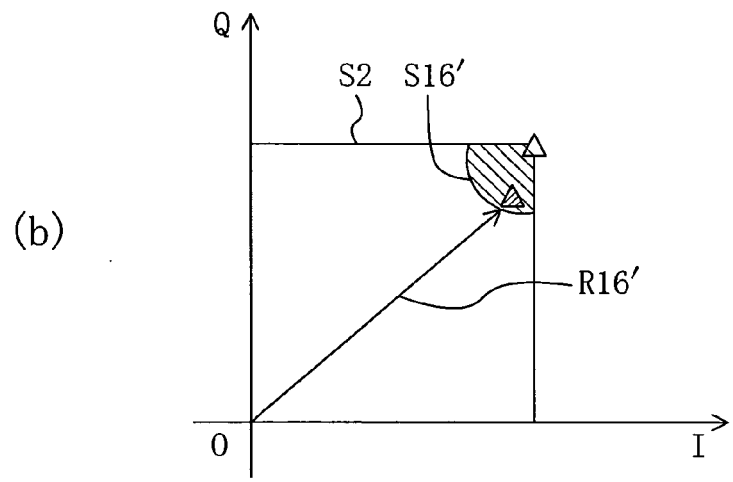
(b)
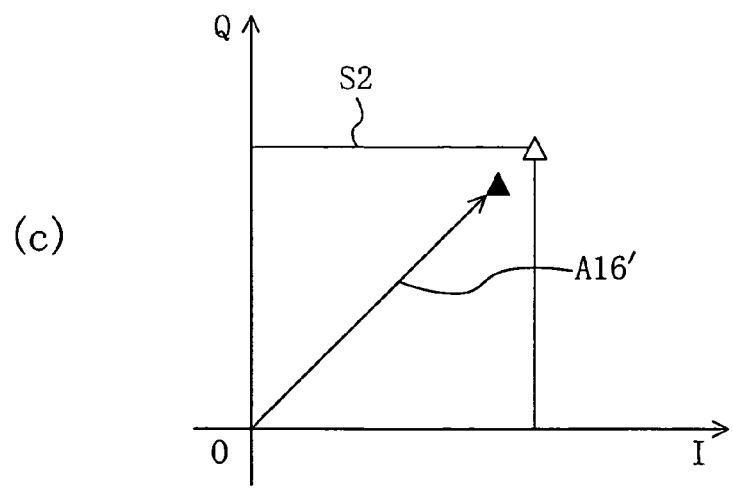
(c)

FIG. 13
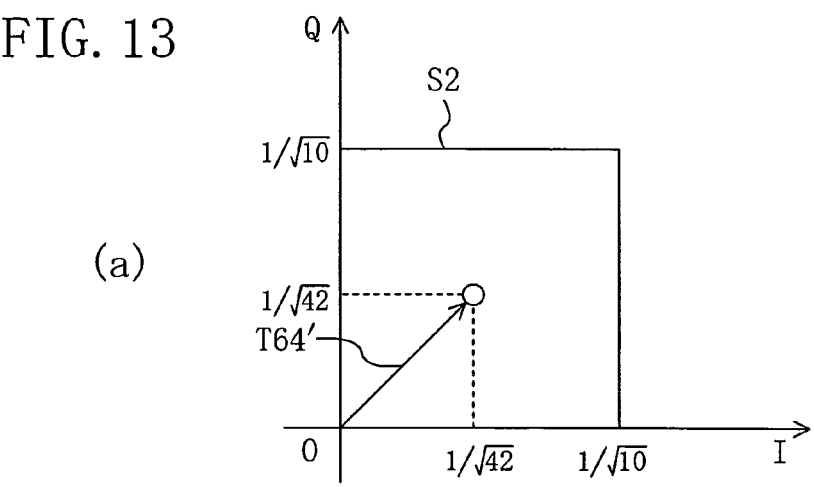
(a)
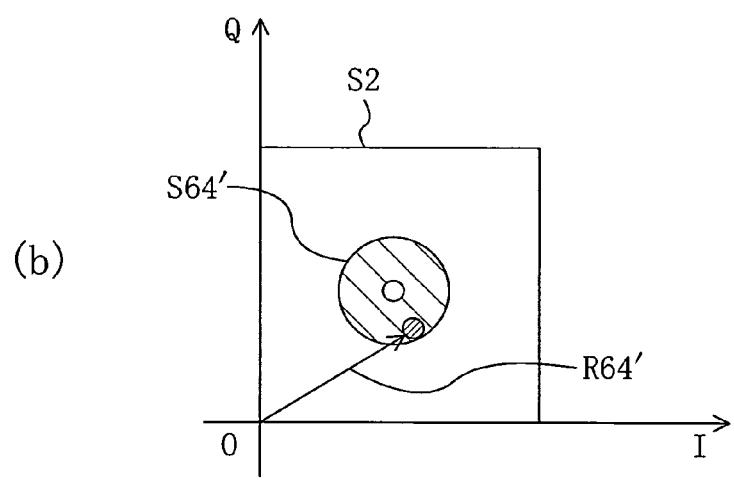
(b)
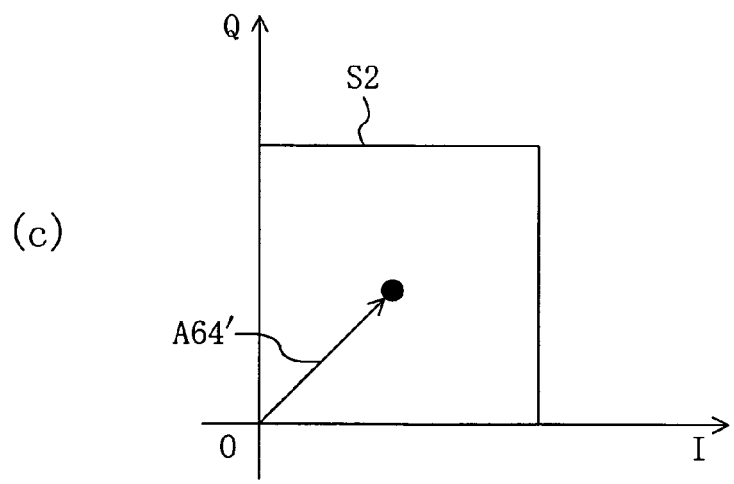
(c)

OFDM RECEPTION APPARATUS AND OFDM RECEPTION METHOD

RELATED APPLICATIONS

This application is the U.S. National Phase under 35 U.S.C. §371 of International Application No. PCT/JP2005/008615, filed on May 11, 2005, which in turn claims the benefit of Japanese Application No. 2004-141554, filed on May 11, 2004, the disclosures of which Applications are incorporated by reference herein.

TECHNICAL FIELD

The present invention relates to an apparatus and a method for receiving a transmitted signal which is digitally modulated using an Orthogonal Frequency Division Multiplexing (OFDM) scheme or the like.

BACKGROUND ART

OFDM is used as a transmission scheme for digital terrestrial broadcasting in Europe and Japan, wireless LAN, and the like.

The OFDM scheme is a method of performing modulation/demodulation while assigning data to a plurality of carriers orthogonal to each other. An Inverse Fast Fourier Transform (IFFT) process is performed in a transmitter, while a Fast Fourier Transform (FFT) process is performed in a receiver. Any modulation scheme can be applied to each carrier, and QPSK (Quaternary Phase Shift Keying), QAM (Quadrature Amplitude Modulation), and the like can be selected.

According to the transmission standards ISDB-T for digital terrestrial television broadcasting which are adopted in Japan, a transmission signal in digital terrestrial television broadcasting is composed of 13 OFDM segments (hereinafter simply referred to as "segments"). FIG. 3 is a spectral diagram of a transmission signal defined in ISDB-T. Each segment has a band width which is obtained by dividing a transmission band width of one television broadcasting channel into 14 equal parts, and is composed of a plurality of carriers.

One or a plurality of segments constitute one hierarchical layer, and for each hierarchical layer, transmission parameters, such as a modulation scheme (e.g., QPSK, 16 QAM, or 64 QAM), a coding rate (e.g., ½, ⅔, or ¾) of inner code, and the like, can be set. Note that the largest number of hierarchical layers which can be simultaneously transmitted is 3 (a hierarchical layer A, a hierarchical layer B, and a hierarchical layer C), and a partial reception portion described below is counted as one hierarchical layer. Further, in ISDB-T, in order to reduce an influence of interference on a transmission channel, interleaving on a frequency axis (frequency interleaving) and interleaving on a time axis (time interleaving) are assumed to be performed.

The frequency interleaving defined in ISDB-T is performed in ways which vary depending on the structure and contents of hierarchical layers constituting an OFDM signal. A specific example thereof will be described.

FIG. 25 is a schematic diagram illustrating the frequency interleaving of an OFDM signal when single-hierarchical layer transmission is performed. FIG. 25 illustrates the case where only the hierarchical layer A (modulation scheme: 64 QAM) is transmitted. As can be seen, in the frequency interleaving for single-hierarchical layer transmission, carriers belonging to all the 13 segments switch places (interleave) with each other across a whole transmission band.

On the other hand, FIG. 26 is a schematic diagram illustrating the frequency interleaving of an OFDM signal when two-hierarchical layer transmission for partial reception is performed. FIG. 26 illustrates the case where the hierarchical layer A for partial reception (modulation scheme: QPSK) and the hierarchical layer B not for partial reception (modulation scheme: 64 QAM) are transmitted. As illustrated in FIG. 26, in ISDB-T, the hierarchical layer A is composed only of a segment having a segment number 0 which is located at the center of a transmission band, and the frequency interleaving can be performed in the segment. In this case, a carrier belonging to the center segment does not switch places with the other segment carriers. Therefore, it is possible to receive a portion of a service using a reception apparatus which can receive only the center segment, i.e., "partial reception". Hereinafter, a hierarchical layer for partial reception is referred to as a partial reception portion.

As described above, in ISDB-T, the process of the frequency interleaving significantly varies, depending on the configuration and contents of hierarchical layers and the presence or absence of the partial reception portion. Therefore, in order to perform frequency deinterleaving with respect to a received OFDM signal, it is necessary to change the process, depending on whether or not the partial reception portion is transmitted. Also, in order to perform an error correction with respect to the received OFDM signal, it is necessary to identify a modulation scheme for a demodulated carrier before soft decision (demapping) of transmitted data.

In the case of ISDB-T, information about transmission parameters, such as the presence or absence of partial reception portion, a modulation scheme and the like, are generally obtained by obtaining and employing transmission control information called TMCC (Transmission and Multiplexing Configuration Control) information inserted in an OFDM transmission signal.

The TMCC information is information which is required for demodulation and error correction processes in a reception apparatus, and includes transmission parameters for each hierarchical layer (e.g., a modulation scheme, a coding rate, a time interleaving length, the number of segments, etc.), a flag indicating the presence or absence of partial reception portion, and the like. The TMCC information is inserted in a predetermined carrier (hereinafter referred to as a TMCC carrier) of an OFDM signal with predetermined symbol timing, and since the position of the insertion is known, various kinds of information can be obtained in a receiver as required.

According to the transmission format of ISDB-T, one frame is composed of 204 symbols as one cycle. The TMCC information, which has 204 bits, is transmitted using a TMCC carrier at a rate of one bit per symbol. For example, information indicating the presence or absence of partial reception portion, i.e., a partial reception flag, is transmitted using a TMCC carrier at a symbol having symbol number 27. Regarding information about the modulation scheme for each hierarchical layer, the hierarchical layer A is transmitted using TMCC carriers at symbol numbers 28 to 30, the hierarchical layer B is transmitted using TMCC carriers at symbol numbers 41 to 43, and the hierarchical layer C is transmitted using TMCC carriers at symbol numbers 54 to 56.

In a reception apparatus which receives an OFDM signal having such a transmission format, a time required from the start of reception of an OFDM signal selected by a tuning operation or the like, followed by demodulation and error correction, until video, audio or the like is output, is discussed.

FIG. 27 is a diagram for explaining timing with which TMCC information is obtained. As illustrated in FIG. 27, it is assumed that a reception apparatus starts a reception operation at time t0, followed by input level adjustment, frequency synchronization or the like of a received signal, and obtaining of TMCC information is started at time t1, and all 204 bits of the TMCC information are completely obtained at time t2. After completing obtaining of a partial reception flag, the reception apparatus recognizes the segment structure of the OFDM signal based on the partial reception flag, successively followed by processes, such as frequency deinterleaving, time deinterleaving, demapping, error correction, and the like.

A time $\Delta ta$ from the start of obtaining of TMCC information to the completion of obtaining of a partial reception flag is maximum when the obtaining of TMCC information starts at symbol number 28 and the obtaining of a partial reception flag is completed at symbol number 27 of the next frame. In this case, the time $\Delta ta$ is a time required for transmission of 204 symbols. The time is as large as about 257 msec when a Mode and a guard ratio defined in ISDB-T are 3 and ¼, respectively.

On the other hand, the same is true of a time required to obtain information about a modulation scheme for each hierarchical layer. For example, a time from the start to completion of obtaining of TMCC information required for identification of a modulation scheme for the hierarchical layer A is maximum when the obtaining of TMCC information is started at symbol number 31 and is completed at symbol number 30. Thus, it takes as large as about 257 msec (Mode: 3; and guard ratio: ¼) to transmit 204 symbols (the same time is required for hierarchical layers B and C).

Therefore, an OFDM reception apparatus is known in which TMCC information (e.g., a partial reception flag, a carrier modulation scheme, a time interleaving length, etc.) required for demodulation and error correction processes is previously stored in a memory, the TMCC information stored in the memory is read out every time a reception operation is started, and based on the TMCC information thus read out, demodulation and error correction operations are performed. Such an OFDM reception apparatus is disclosed in, for example, Patent Document 1 below.

Patent Document 1: JP 2001-292121 A

DISCLOSURE OF THE INVENTION

Problems to be Solved by the Invention

Thus, the time required from the start of obtaining of TMCC information to completion of obtaining of a partial reception flag or information about a carrier modulation scheme may lead to a delay in the start of frequency deinterleaving or the start of a soft decision process. This has a significant influence on a time required from the start of a reception operation to the output of video, audio or the like of a reception apparatus.

The contents of transmission control information (TMCC information), such as the hierarchical layer configuration, modulation scheme and the like of an OFDM signal, are supposed to be arbitrarily set by a broadcasting station (transmitter), and may be changed, depending on the broadcasting time. Specifically, when TMCC information stored in a memory is read out and used, the contents of the TMCC information stored in the memory may differ from the contents of latest TMCC information of an actually received OFDM signal. When demodulation and error correction processes are not performed based on the contents of correct TMCC information, an unnecessary delay time occurs in the time from the start of a reception operation to the output of transmitted video, audio or the like.

An object of the present invention is to shorten a time from the start of a reception operation with respect to a transmitted signal to the output of transmitted video, audio or the like.

Solution to the Problems

The present invention is configured to obtain a carrier modulation scheme based on a signal point of a carrier of a received OFDM signal or the like, and perform a process for obtaining transmitted information with respect to the received OFDM signal or the like, depending on the obtained modulation scheme.

More specifically, the present invention provides an OFDM reception apparatus for receiving an OFDM (Orthogonal Frequency Division Multiplexing) signal composed of a plurality of carriers, comprising a fast Fourier transform section for converting a received time-domain OFDM signal into a frequency-domain OFDM signal, an equalization section for performing waveform equalization with respect to the frequency-domain OFDM signal, and outputting a waveform-equalized OFDM signal, and a modulation scheme estimating section for estimating a modulation scheme for a plurality of carriers constituting the waveform-equalized OFDM signal based on signal points of the plurality of carriers, and outputting an obtained estimation result. The received OFDM signal is subjected to a process for obtaining transmitted information, depending on the estimation result.

Thereby, a modulation scheme is estimated based on a signal point of a carrier constituting a received OFDM signal, and a process for obtaining transmitted information is performed, depending on the estimated modulation scheme, so that it is not necessary to wait for completion of reception of a transmission parameter (transmission control information) about the received OFDM signal. Therefore, a time from the start of a reception operation to the output of video, audio or the like can be significantly reduced.

Effect of the Invention

According to the present invention, a process for obtaining transmitted information can be performed at an early stage after the start of reception, thereby making it possible to significantly reduce the time from the start of a reception operation to the output of video, audio or the like. Therefore, for example, when a number of stations are successively selected, video or the like can be smoothly viewed without a wait.

BRIEF DESCRIPTION OF THE DRAWINGS

FIG. 8(a) is a diagram illustrating an ideal signal point in a region S1 when carriers are modulated by QPSK. FIG. 8(b) is a diagram illustrating a range in which signal points of actually received carriers are present when the carriers are modulated by QPSK. FIG. 8(c) is a diagram illustrating an average vector of the actually received carriers.

FIG. 9(a) is a diagram illustrating an ideal signal point in the region S1 when carriers are modulated by 16 QAM. FIG. 9(b) is a diagram illustrating a range in which signal points of actually received carriers are present when the carriers are modulated by 16 QAM. FIG. 9(c) is a diagram illustrating an average vector of the actually received carriers.

FIG. 10(a) is a diagram illustrating ideal signal points in the region S1 when carriers are modulated by 64 QAM. FIG. 10(b) is a diagram illustrating a range in which signal points of actually received carriers are present when the carriers are modulated by 64 QAM. FIG. 10(c) is a diagram illustrating an average vector of the actually received carriers.

FIG. 12(a) is a diagram illustrating an ideal signal point in a region S2 when carriers are modulated by 16 QAM. FIG. 12(b) is a diagram illustrating a range in which signal points of actually received carriers are present when the carriers are modulated by 16 QAM. FIG. 12(c) is a diagram illustrating an average vector of the actually received carriers.

FIG. 13(a) is a diagram illustrating an ideal signal point in the region S2 when carriers are modulated by 64 QAM. FIG. 13(b) is a diagram illustrating a range in which signal points of actually received carriers are present when the carriers are modulated by 64 QAM. FIG. 13(c) is a diagram illustrating an average vector of the actually received carriers.

Figure 1:
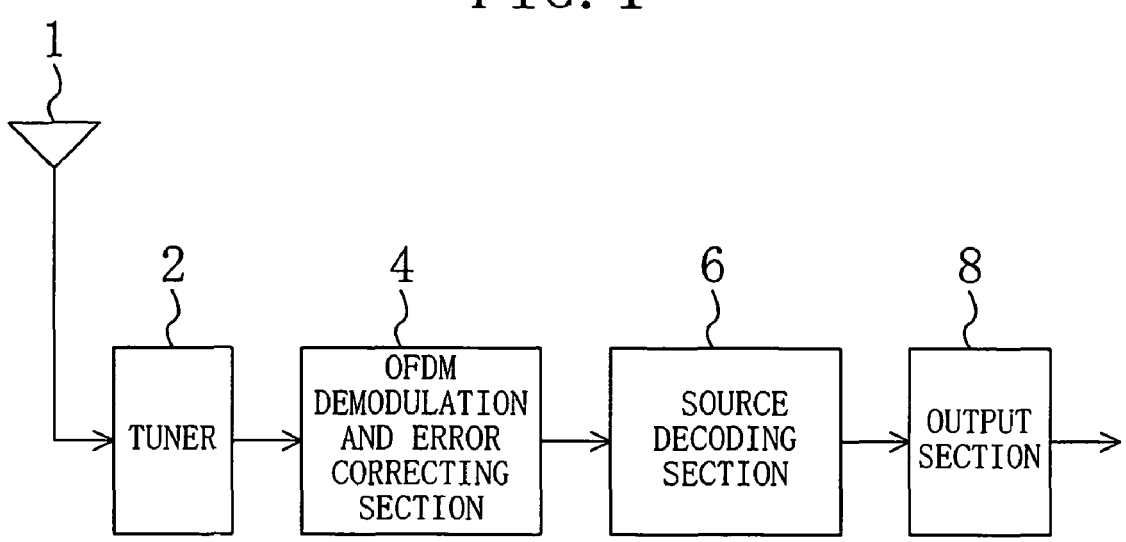
FIG. 1 is a block diagram illustrating an exemplary configuration of an OFDM reception apparatus according to an embodiment of the present invention.

DESCRIPTION OF THE REFERENCE CHARACTERS 14 quadrature demodulation section
16 FFT section (Fast Fourier Transform section)
18 equalization section
20, 220, 620 partial reception determining section
15 22, 23 segment extracting section
24, 25, 424 modulation scheme estimating section
26, 226 determination section
30, 730 deinterleaving section
42, 442, 642 demapping section
20 44 error correcting section
46, 546 transmission control information obtaining section
48, 548 selection section

BEST MODE FOR CARRYING OUT THE INVENTION

Hereinafter, embodiments of the present invention will be described with reference to the accompanying drawings.

FIG. 1 is a block diagram illustrating an exemplary configuration of an OFDM reception apparatus according to an embodiment of the present invention. The OFDM reception apparatus of FIG. 1 comprises a tuner 2, an OFDM demodulation and error correcting section 4, a source decoding section 6, and an output section 8.

An antenna 1 receives and supplies an RF (Radio Frequency) band OFDM signal to the tuner 2. The tuner 2 converts the RF-band OFDM signal supplied from the antenna 1 into an IF (Intermediate Frequency) band OFDM signal, and outputs the IF-band signal to the OFDM demodulation and error correcting section 4.

The OFDM demodulation and error correcting section 4 performs demodulation and error correction with respect to the IF-band OFDM signal supplied from the tuner section 2 to restore a transmitted TS (Transport Stream), and outputs the restored TS to the source decoding section 6. The OFDM demodulation and error correcting section 4 estimates a carrier modulation scheme, and performs a process for obtaining transmitted information (frequency deinterleaving, demapping, etc.), depending on the estimated modulation scheme.

The source decoding section 6 performs separation and decompression of information with respect to the TS supplied from the OFDM demodulation and error correcting section 4 to generate transmitted video, audio and other data, and outputs the generated video and audio data to the output section 8, and optionally outputs the other data to the outside of the OFDM reception apparatus. The output section 8 has a CRT (Cathode Ray Tube) and a loudspeaker, and outputs video to the CRT and audio to the loudspeaker based on the video and audio data supplied from the source decoding section 6.

Hereinafter, some embodiments of the OFDM reception apparatus of FIG. 1 will be described.

First Embodiment

Figure 2:
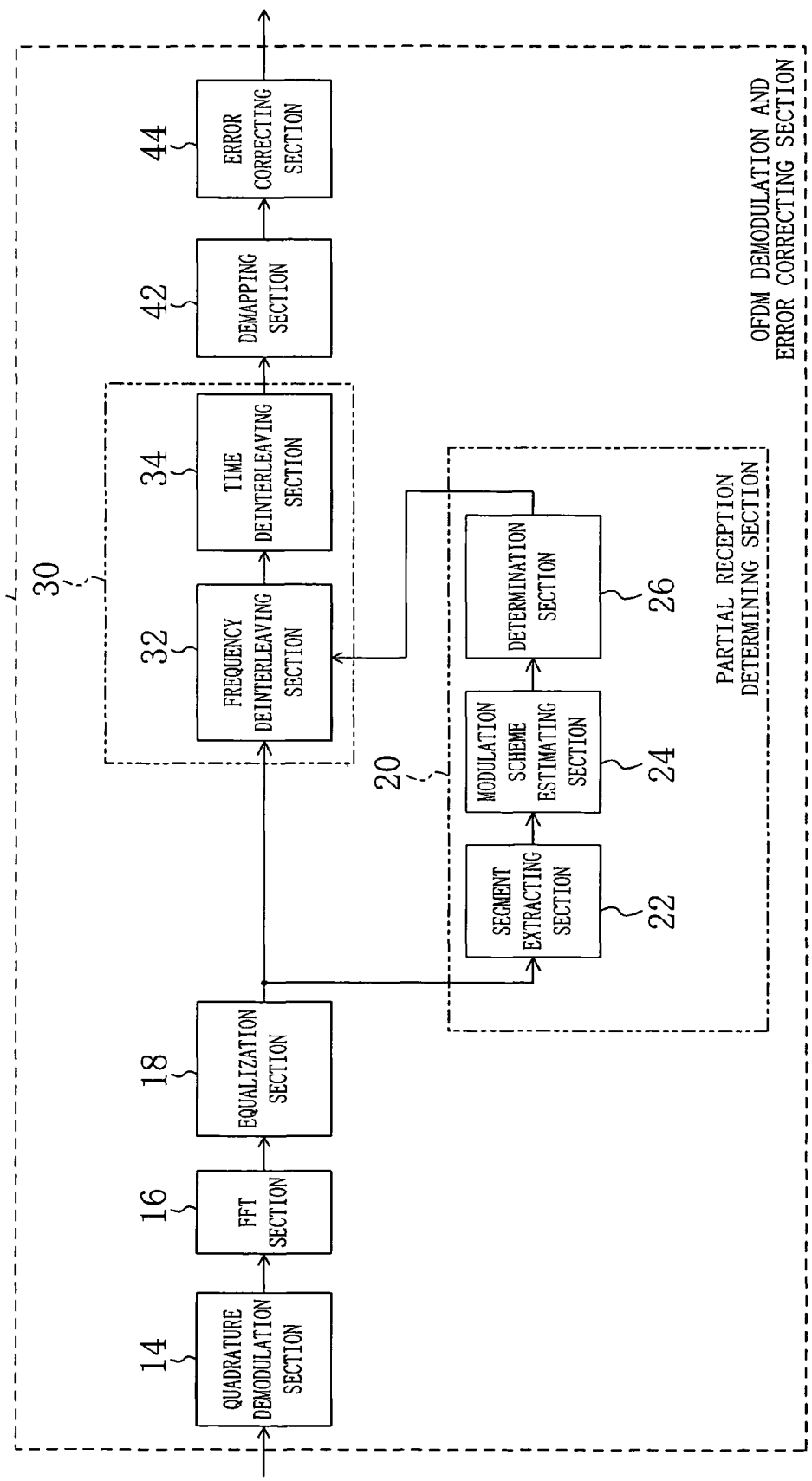
FIG. 2 is a block diagram illustrating an exemplary configuration according to a first embodiment of the OFDM demodulation and error correcting section of FIG. 1.

FIG. 2 is a block diagram illustrating an exemplary configuration according to a first embodiment of the OFDM demodulation and error correcting section of FIG. 1. The OFDM demodulation and error correcting section 4 of FIG. 2 comprises a quadrature demodulation section 14, an FFT section (Fast Fourier Transform section) 16, an equalization section 18, a partial reception determining section 20, a deinterleaving section 30, a demapping section 42, and an error correcting section 44. The deinterleaving section 30 has a frequency deinterleaving section 32 and a time deinterleaving section 34.

The quadrature demodulation section 14 converts the IF-band OFDM signal supplied from the tuner 2 into a baseband OFDM signal, and outputs the baseband OFDM signal to the FFT section 16. The FFT section 16 converts the baseband OFDM signal (time-domain signal) into a frequency-domain OFDM signal by performing Fourier transform, and outputs the frequency-domain OFDM signal to the equalization section 18. The converted frequency-domain OFDM signal indicates a phase and an amplitude of each carrier. Each carrier is represented in the form of a vector having an I-axis direction component and a Q-axis direction component independently (called constellation).

The equalization section 18 performs compensation (waveform equalization) with respect to a distortion occurring in the frequency-domain OFDM signal on a transmission channel, and outputs the waveform-equalized OFDM signal to the partial reception determining section 20 and the frequency deinterleaving section 32. The partial reception determining section 20 determines whether or not information for partial reception is transmitted (i.e., whether or not there is a partial reception portion), based on the waveform-equalized OFDM signal supplied from the equalization section 18, and outputs the determination result to the frequency deinterleaving section 32.

The deinterleaving section 30 resets interleaving (deinterleaving) with respect to the received OFDM signal. The frequency deinterleaving section 32 resets frequency interleaving (frequency deinterleaving) with respect to an output of the equalization section 18, based on the determination result supplied from the partial reception determining section 20, using methods respectively suitable for the case where there is a partial reception portion and the case where there is not a partial reception portion, and outputs the frequency-deinterleaved OFDM signal to the time deinterleaving section 34.

The time deinterleaving section 34 resets time interleaving (time deinterleaving) with respect to the frequency-deinterleaved OFDM signal supplied from the frequency deinterleaving section 32, and outputs the time-deinterleaved OFDM signal to the demapping section 42.

The demapping section 42 performs soft decision (demapping) corresponding to the modulation scheme of each carrier with respect to the time-deinterleaved OFDM signal supplied from the time deinterleaving section 34, to calculate soft decision metric data, and outputs the soft decision metric data thus obtained to the error correcting section 44. The error correcting section 44 performs error correction by Viterbi decoding, Reed-Solomon decoding or the like with respect to the soft decision metric data supplied from the demapping section 42, to restore the transmitted TS. The TS restored by the error correcting section 44 is an output of the OFDM demodulation and error correcting section 4.

Figure 3:
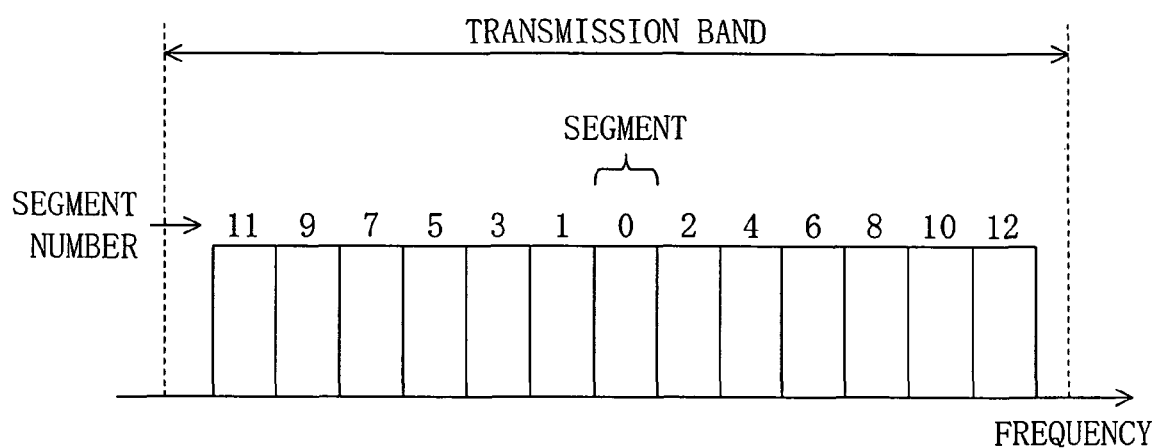
FIG. 3 is a spectral diagram of a transmission signal defined in ISDB-T.

FIG. 3 is a spectral diagram of a transmission signal defined in ISDB-T. An OFDM signal in ISDB-T has 13 segments arranged as illustrated in FIG. 3. Each segment includes a plurality of carriers. Hereinafter, a segment having segment number 0 is referred to as a "center segment", and segments having segment numbers 1 to 12 are referred to as "non-center segments". When a segment for partial reception is transmitted, a hierarchical layer is composed of the center segment, and another hierarchical layer is composed of the non-center segments. When a segment for partial reception is not transmitted, all the 13 segments constitute a single hierarchical layer, for example.

In ISDB-T, the 13 segments are divided into a plurality of hierarchical layers, which are in turn transmitted. Such hierarchical layer transmission is a significant feature of ISDB-T. By a modulation scheme and error correction capability having a different error resistance property, the amount of transmitted information or the like for each hierarchical layer, a broadcasting service which can be enjoyed simultaneously by different reception forms, such as a fixed reception apparatus, a mobile reception apparatus, and a portable reception apparatus, can be achieved. For example, a service has been studied in which all segments to be transmitted constitute the same hierarchical layer, and 64 QAM capable of securing a large transmission capacity is used as a modulation scheme to transmit the segments to a fixed reception apparatus which can receive a high-definition television program or the like.

Also, a form of service has been studied in which a center segment is a partial reception portion, the segment is transmitted as a hierarchical layer for a portable reception apparatus, and the remaining 12 segments are transmitted as a hierarchical layer for a fixed reception apparatus. In this case, QPSK (or 16 QAM) having a relatively high level of resistance to interference on a transmission channel is used as a modulation scheme for the partial reception portion, and 64 QAM which can secure a high transmission capacity is used as a modulation scheme for the remaining 12 segments.

Therefore, in the case where attention is paid to a modulation scheme for the center segment, if a modulation scheme for a carrier belonging to the center segment is QPSK or 16 QAM, it is estimated that "there is a partial reception portion", and if a modulation scheme for a carrier belonging to the center segment is 64 QAM, it is estimated that "there is not a partial reception portion". Such estimation is considered to be valid with a considerably high probability.

Therefore, the partial reception determining section 20 of FIG. 2 estimates a modulation scheme for the carriers based on the waveform-equalized OFDM signal supplied from the equalization section 18, and based the estimation result, determines that "there is a partial reception portion" if a modulation scheme for a plurality of carriers belonging to the center segment is QPSK or 16 QAM, and that "there is not a partial reception portion" if the modulation scheme is another modulation scheme (e.g., 64 QAM). Thereafter, the frequency deinterleaving section 32 performs a frequency deinterleaving process, depending on the determination result of the partial reception determining section 20.

Specifically, when it is determined that there is a partial reception portion, the frequency deinterleaving section 32 assumes that the input OFDM signal is of "two-hierarchical layer transmission where there is a partial reception", and performs frequency deinterleaving with respect to the center segment and the non-center segments independently. When it is determined that there is not a partial reception portion, the frequency deinterleaving section 32 assumes that the input OFDM signal is of "single-hierarchical layer transmission", and performs frequency deinterleaving with respect to the center segment and the non-center segments together.

As illustrated in FIG. 2, the partial reception determining section 20 comprises a segment extracting section 22, a modulation scheme estimating section 24, and a determination section 26. The segment extracting section 22 extracts a carrier belonging to the center segment from the waveform-equalized OFDM signal supplied from the equalization section 18, and outputs the carrier to the modulation scheme estimating section 24. The modulation scheme estimating section 24 estimates a modulation scheme for the carrier belonging to the center segment supplied from the segment extracting section 22, and outputs the estimation result to the determination section 26.

The determination section 26 determines the presence or absence of a hierarchical layer for partial reception based on the estimation result from the modulation scheme estimating section 24, i.e., the modulation scheme for the carrier belonging to the center segment. Specifically, when the result of estimation of a modulation scheme for the carrier belonging to the center segment is QPSK or 16 QAM, it is determined that "there is a partial reception portion". When the estimation result is 64 QAM, it is determined that "there is not a partial reception portion". The determination section 26 outputs the determination result to the frequency deinterleaving section 32.

Next, the modulation scheme estimating section 24 will be described in detail. Here, as an example, a modulation scheme for a received OFDM signal is assumed to be any of QPSK, 16 QAM, and 64 QAM.

Figure 4:
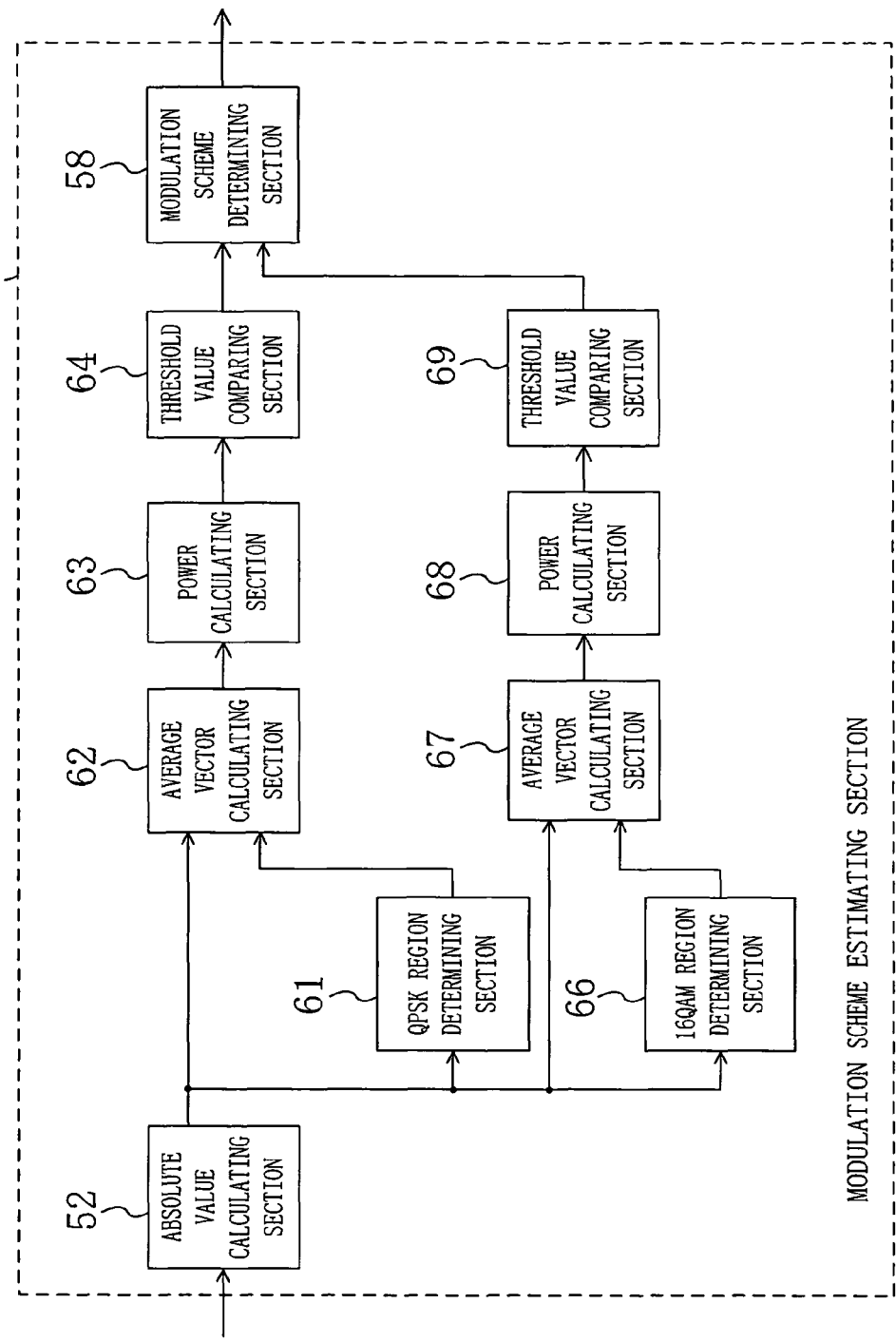
FIG. 4 is a block diagram illustrating an exemplary configuration of a modulation scheme estimating section of FIG. 2.

FIG. 4 is a block diagram illustrating an exemplary configuration of the modulation scheme estimating section 24 of FIG. 2. The modulation scheme estimating section 24 comprises an absolute value calculating section 52, a QPSK region determining section 61, average vector calculating sections 62 and 67, power calculating sections 63 and 68, threshold value comparing sections 64 and 69, a 16 QAM region determining section 66, and a modulation scheme determining section 58.

The absolute value calculating section 52 calculates the absolute values |I| and |Q| of the I-axis and Q-axis components of the waveform-equalized OFDM signal supplied to the modulation scheme estimating section 24 (here, |*| indicates the absolute value of *), and outputs the calculated absolute values |I| and |Q| to the QPSK region determining section 61, the average vector calculating sections 62 and 67, and the 16 QAM region determining section 66.

The QPSK region determining section 61 determines whether or not the absolute values |I| and |Q| supplied from the absolute value calculating section 52 fall within predetermined ranges, for each carrier, and outputs the determination result to the average vector calculating section 62. The average vector calculating section 62 calculates average values ave(|I|) and ave(|Q|)(here, ave(*) indicates an average value of *) for carriers whose absolute values |I| and |Q| are determined by the QPSK region determining section 61 to fall within the predetermined ranges, and outputs a vector having the calculated ave(|I|) and ave(|Q|) as an I-axis component and a Q-axis component, respectively, as an average vector to the power calculating section 63.

The power calculating section 63 calculates the squared sum $(\text{ave}(|I|))^2+(\text{ave}(|Q|))^2$ with respect to the I-axis component and the Q-axis component of the average vector supplied from the average vector calculating section 62, and outputs the calculation result as a power value to the threshold value comparing section 64. In other words, the power calculating section 63 obtains the square of an amplitude of the average vector. The threshold value comparing section 64 compares the power value supplied from the power calculating section 63 with a predetermined threshold value, and outputs the comparison result to the modulation scheme determining section 58.

The 16 QAM region determining section 66 determines whether or not the absolute values |I| and |Q| supplied from the absolute value calculating section 52 fall within predetermined ranges, for each carrier, and outputs the determination result to the average vector calculating section 67. The average vector calculating section 67 calculates average values ave(|I|) and ave(|Q|) for carriers whose absolute values |I| and |Q| are determined by the 16 QAM region determining section 66 to fall within predetermined ranges, and outputs a vector having the calculated ave(|I|) and ave(|Q|) as an I-axis component and a Q-axis component, as an average vector, to the power calculating section 68.

The power calculating section 68 calculates the squared sum $(\text{ave}(|I|))^2+(\text{ave}(|Q|))^2$ of the I-axis component and the Q-axis component of the average vector supplied from the average vector calculating section 67, and outputs the calculation result as a power value to the threshold value comparing section 69. The threshold value comparing section 69 compares the power value supplied from the power calculating section 68 with a predetermined threshold value, and outputs the comparison result to the modulation scheme determining section 58.

The modulation scheme determining section 58 determines of which modulation scheme the signal input to the modulation scheme estimating section 24 is, QPSK, 16 QAM, or 64 QAM, based on the comparison results supplied from the threshold value comparing sections 64 and 69, and outputs the determination result. The determination result of the modulation scheme determining section 58 is the estimation result of the modulation scheme estimating section 24.

Figure 5:
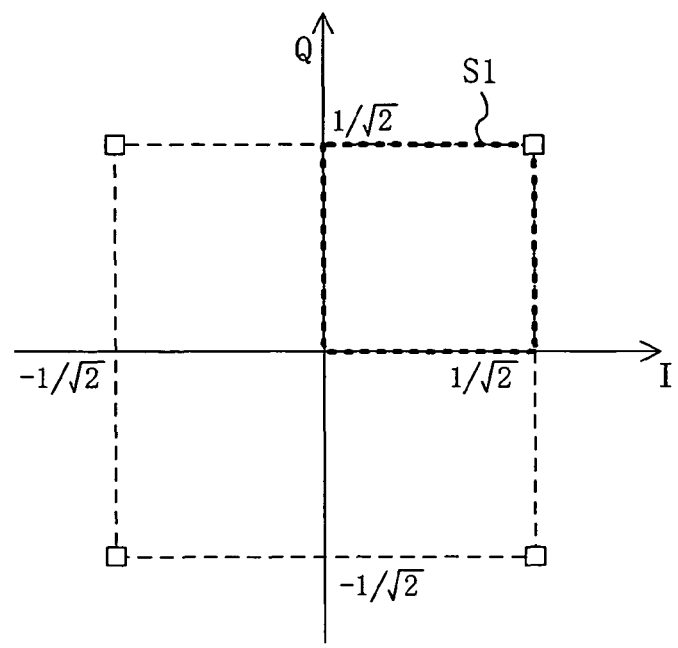
FIG. 5 is a signal point arrangement diagram (constellation) when a carrier modulation scheme is QPSK.
Figure 6:
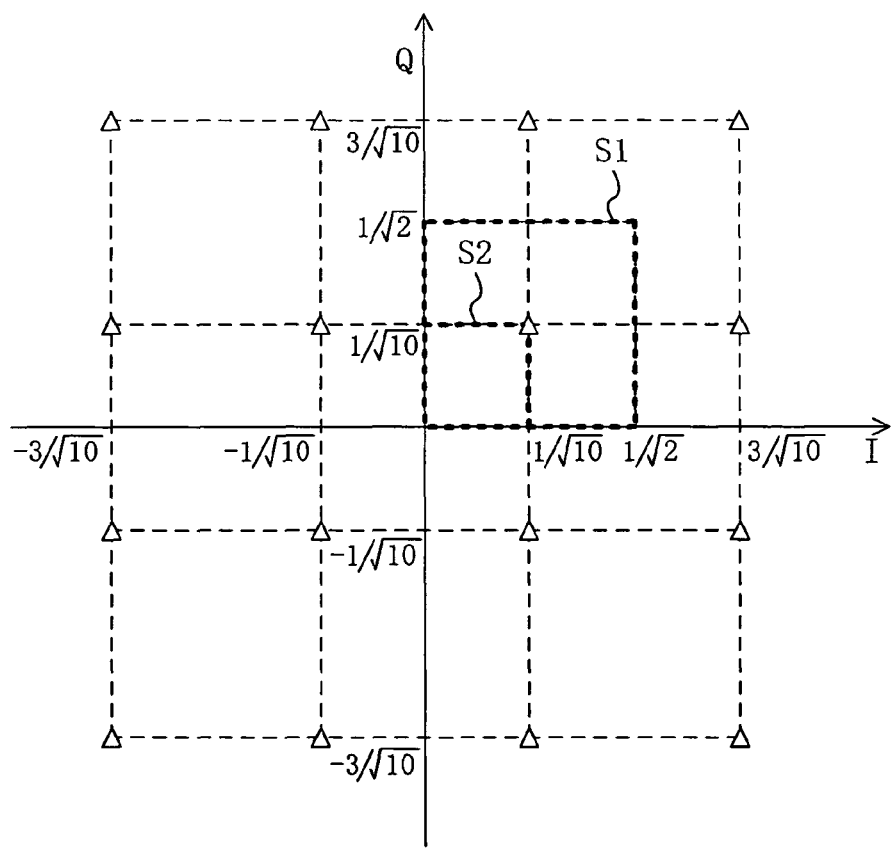
FIG. 6 is a signal point arrangement diagram when a carrier modulation scheme is 16 QAM.
Figure 7:
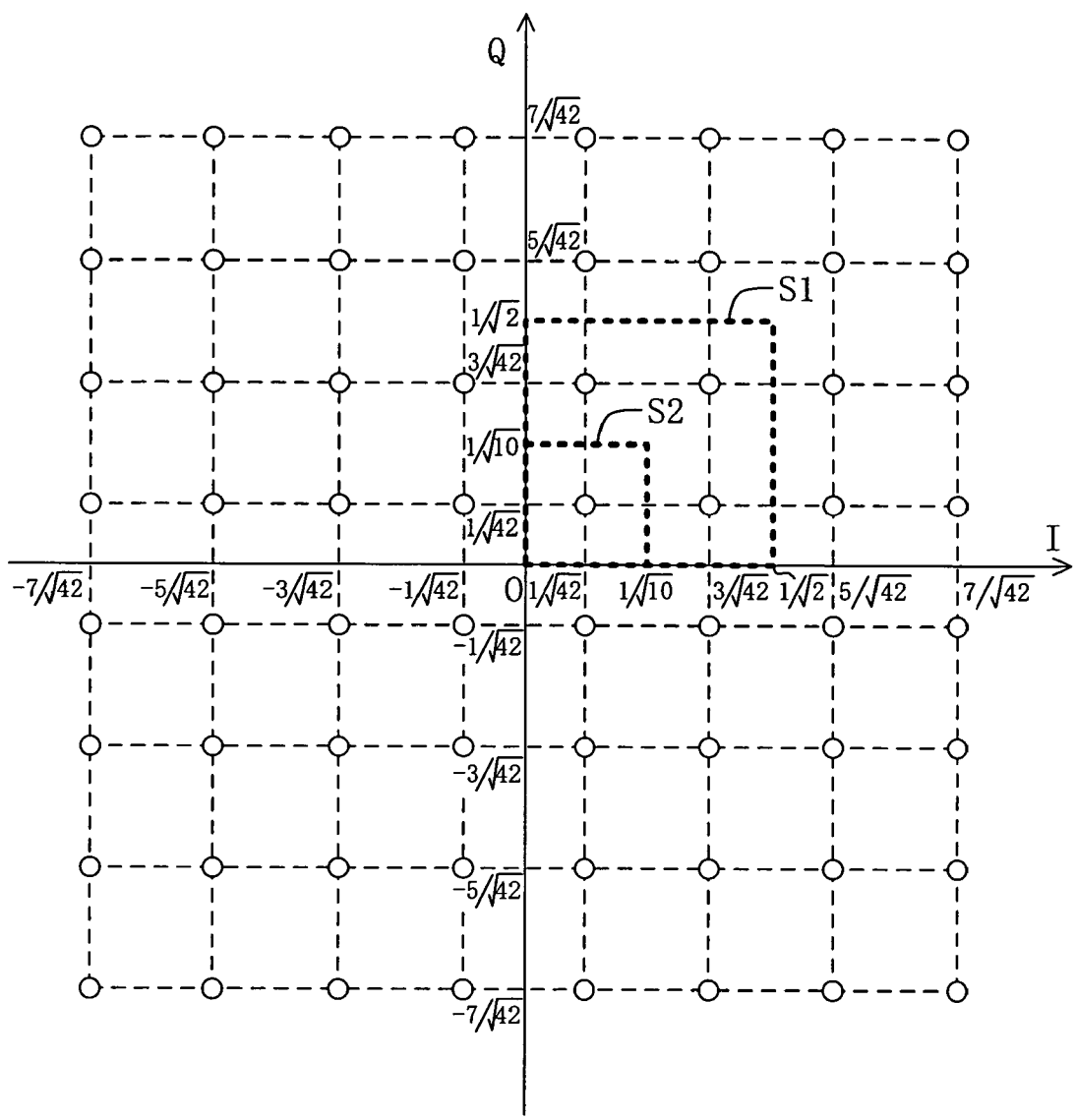
FIG. 7 is a signal point arrangement diagram when a carrier modulation scheme is 64 QAM.

Hereafter, an operation of the modulation scheme estimating section 24 of FIG. 4 will be described in detail. FIG. 5 is a signal point arrangement diagram (constellation) when a carrier modulation scheme is QPSK. FIG. 6 is a signal point arrangement diagram when a carrier modulation scheme is 16 QAM. FIG. 7 is a signal point arrangement diagram when a carrier modulation scheme is 64 QAM. FIGS. 5 to 7 illustrate arrangements of signal points on an I-Q coordinate plane during transmission regarding the modulation schemes used in ISDB-T. Note that the signal point arrangements of FIGS. 5 to 7 are assumed to be normalized so that the average power of carriers is 1.

When there is not the influence of interference, such as Gaussian noise (hereinafter simply referred to as "noise") or the like, signal points during reception substantially coincide these transmission signal points, i.e., ideal signal points. However, when there is an influence of interference or the like, the waveform-equalized signal points are deviated from the ideal signal points, depending on the degree of the influence, and are distributed around the respective ideal signal points.

The modulation scheme estimating section 24 is supposed to estimate a modulation scheme from the waveform-equalized OFDM signal, and the estimation precision is improved and a time required for the estimation is reduced, with an increase in the number of carriers used for estimation in one symbol. Therefore, the number of carriers used for estimation in each symbol is increased as much as possible. Therefore, the symmetry of the constellation is utilized so as to use as many carriers as possible in limited circuit and operation scales.

Specifically, the absolute value calculating section 52 obtains the absolute values |I| and |Q| of the I-axis and Q-axis components of a signal point of each carrier, thereby converting the signal point into a point in a region of $I \geq 0$ and $Q \geq 0$ even if the signal point of the input carrier is present at any location on the I-Q plane. The absolute value calculating section 52 outputs the absolute values thus obtained to the QPSK region determining section 61, the average vector calculating sections 62 and 67, and the 16 QAM region determining section 66.

The QPSK region determining section 61, the average vector calculating section 62, the power calculating section 63, and the threshold value comparing section 64 of FIG. 4 determines whether or not a carrier modulation scheme is QPSK. The QPSK region determining section 61 determines whether or not the components (I, Q) of a signal point of a carrier input to the modulation scheme estimating section 24 satisfy a condition of $|I| \leq 1/\sqrt{2}$ and $|Q| \leq 1/\sqrt{2}$. Specifically, it is determined whether or not a signal point of a carrier input from the absolute value calculating section 52 falls within a region S1 (a region of $0 \leq I \leq 1/\sqrt{2}$ and $0 \leq Q \leq 1/\sqrt{2}$) of FIGS. 5 to 7, and the determination result is output to the average vector calculating section 62.

The average vector calculating section 62 calculates average values ave(|I|) and ave(|Q|) of the absolute values |I| and |Q| supplied from the absolute value calculating section 52 for carriers which are determined in the QPSK region determining section 61 to satisfy the condition of $|I| \leq 1/\sqrt{2}$ and $|Q| \leq 1/\sqrt{2}$ (in this case, the average may be obtained over a plurality of symbols), and outputs the calculated ave(|I|) and ave(|Q|) to the power calculating section 63. The power calculating section 63 calculates the squared sum $(\text{ave}(|I|))^2 + (\text{ave}(|Q|))^2$ of the ave(|I|) and the ave(|Q|) supplied from the average vector calculating section 62, and outputs the squared sum $(\text{ave}(|I|))^2 + (\text{ave}(|Q|))^2$ to the threshold value comparing section 64.

The process so far described corresponds to determination of vectors having end points present within the region of $|I| \leq 1/\sqrt{2}$ and $|Q| \leq 1/\sqrt{2}$ among vectors (position vectors having a start point at the origin O(0, 0)) indicating signal points of the waveform-equalized OFDM signal supplied to the modulation scheme estimating section 24, and calculation of a power of an average vector (a position vector having a start point at the origin O(0, 0) and an end point at (ave(|I|), ave(|Q|))) of these vectors.

Here, the calculation result of the average vector calculating section 62 when a modulation scheme of carriers supplied to the modulation scheme estimating section 24 is QPSK, 16 QAM, or 64 QAM, will be respectively described.

FIG. 8(*a*) is a diagram illustrating an ideal signal point in the region S1 when carriers are modulated by QPSK. FIG. 8(*b*) is a diagram illustrating a range in which signal points of actually received carriers are present when the carriers are modulated by QPSK. FIG. 8(*c*) is a diagram illustrating an average vector of the actually received carriers.

Initially, assuming that carriers are modulated by QPSK, when the influence of interference is substantially negligible, the coordinates of a signal point output from the absolute value calculating section 52 are (I, Q)=(1/√2, 1/√2). A vector connecting the origin O and the signal point is, for example, a vector TQ of FIG. 8(*a*).

On the other hand, when there is an influence of noise or the like, the signal point output from the absolute value calculating section 24 is deviated from the ideal signal point (1/√2, 1/√2). A vector connecting the origin O and the signal point affected by interference is, for example, a vector RQ of FIG. 8(*b*). The signal point thus affected by interference is distributed in a sector region SQ around the ideal signal point (1/√2, 1/√2) as the center. The average vector calculating section 62 obtains an average vector of vectors connecting the origin O and the respective signal points included in the region S1. As a result, the average vector is, for example, a vector AQ of FIG. 8(*c*).

FIG. 9(*a*) is a diagram illustrating an ideal signal point in the region S1 when carriers are modulated by 16 QAM. FIG. 9(*b*) is a diagram illustrating a range in which signal points of actually received carriers are present when the carriers are modulated by 16 QAM. FIG. 9(*c*) is a diagram illustrating an average vector of the actually received carriers.

Assuming that carriers are modulated by 16 QAM, when the influence of interference is substantially negligible, the coordinates of a signal point output from the absolute value calculating section 52 are (I, Q)=(1/√10, 1/√10). A vector connecting the origin O and the signal point is, for example, a vector T16 of FIG. 9(*a*).

On the other hand, when there is an influence of noise or the like, the signal point output from the absolute value calculating section 52 is deviated from the ideal signal point (1/√10, 1/√10). A vector connecting the origin O and the signal point affected by interference is, for example, a vector R16 of FIG. 9(*b*). The signal point thus affected by interference is distributed in a region S16 around the ideal signal point (1/√10, 1/√10) as the center. The average vector calculating section 62 obtains an average vector of vectors connecting the origin O and the respective signal points included in the region S16. As a result, the average vector is, for example, a vector A16 of FIG. 9(*c*). The vector A16 is approximate to a vector connecting the origin O and the center of the region S1. Note that the result is not significantly affected by the degree of interference, such as C/N when the interference is noise, or the like.

FIG. 10(*a*) is a diagram illustrating ideal signal points in the region S1 when carriers are modulated by 64 QAM. FIG. 10(*b*) is a diagram illustrating a range in which signal points of actually received carriers are present when the carriers are modulated by 64 QAM. FIG. 10(*c*) is a diagram illustrating an average vector of the actually received carriers.

Assuming that carriers are modulated by 64 QAM, when the influence of interference is substantially negligible, the coordinates of a signal point output from the absolute value calculating section 52 are any of four coordinates: (I, Q)= (1/√42, 1/√42), (1/√42, 3/√42), (3/√42, 1/√42), and (3/√42, 3/√42). Vectors connecting the origin O and the signal points are, for example, vector T64 of FIG. 10(*a*).

On the other hand, when there is an influence of noise or the like, the signal point output from the absolute value calculating section 52 is deviated from the four ideal signal points. A vector connecting the origin O and the signal point affected by interference is, for example, a vector R64 of FIG. 10(*b*). The signal point thus affected by interference is distributed in regions S64 around the four respective ideal signal points as the centers. The average vector calculating section 62 obtains an average vector of vectors connecting the origin O and the respective signal points included in the region S1. As a result, the average vector is, for example, a vector A64 of FIG. 10(*c*). The vector A64 is approximate to a vector connecting the origin O and the center of the region S1 as is similar to the vector A16 of FIG. 9(*b*). Note that the result is not significantly affected by the degree of interference, such as C/N when the interference is noise, or the like.

Figure 11:
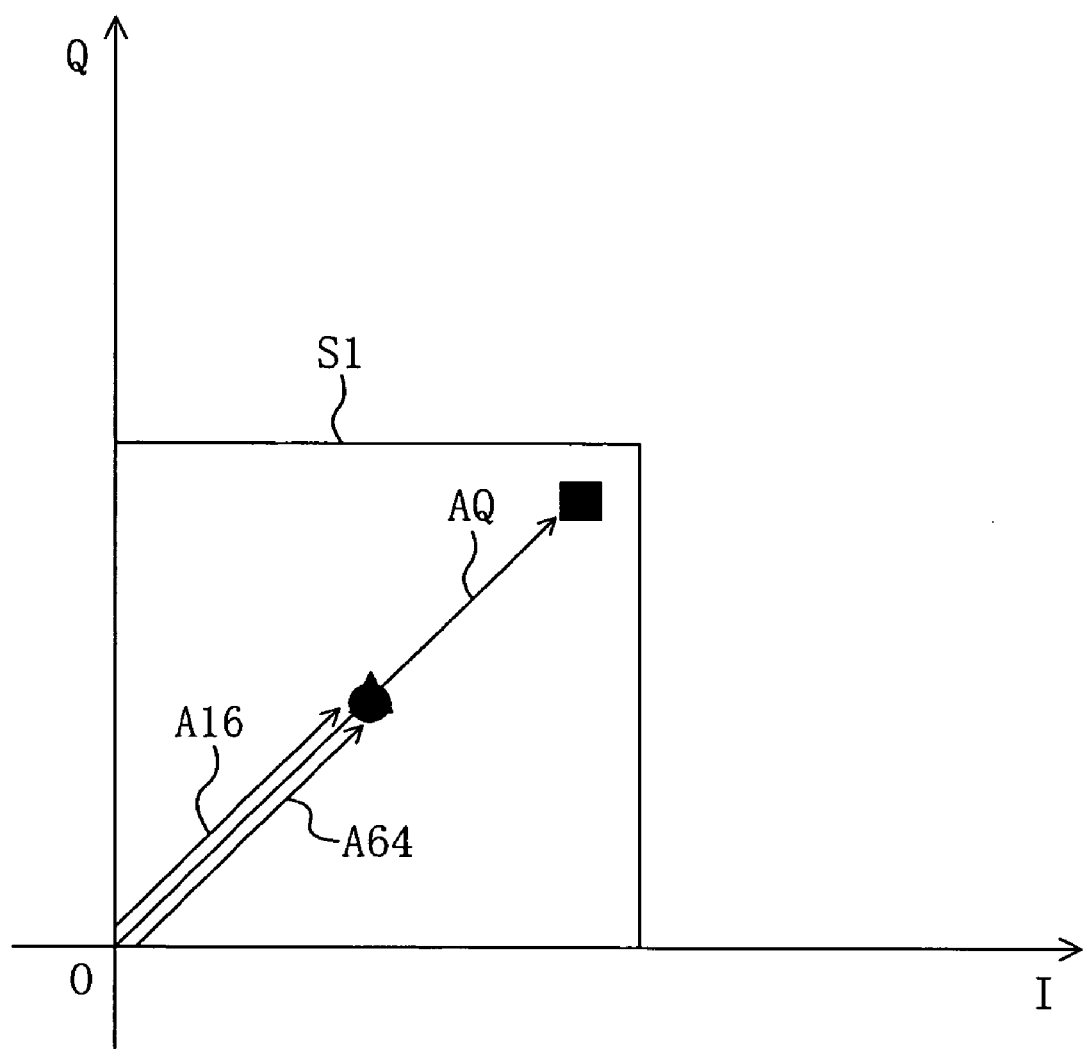
FIG. 11 is a diagram illustrating average vectors AQ, A16 and A64 obtained in an average vector calculating section of FIG. 4.

FIG. 11 is a diagram illustrating the average vectors AQ, A16 and A64 obtained in average vector calculating section

62 of FIG. 4. It is indicated that there is a clear difference on the I-Q plane between the average vector AQ when carriers are modulated by QPSK and the average vector A16 or A64 when carriers are modulated by 16 QAM or 64 QAM. Assuming that each of the vectors AQ, A16 and A64 is a position vector having a start point at the origin O (the end point of the position vector is a point having the average values ave(|I|) and ave(|Q|) obtained in the average vector calculating section 62 as the I-axis coordinate and the Q-axis coordinate), the difference can be easily determined from any of a distance from the origin to the coordinate point of each end point, the squared value (power value) of the distance, and the coordinates of the end point themselves.

Therefore, the threshold value comparing section 64 compares the power value output by the power calculating section 63 with a predetermined threshold value, and when the power value exceeds the threshold value, determines that a modulation scheme for the input carrier is QPSK, and when otherwise, determines that the modulation scheme is not QPSK.

The threshold value used here may be, for example, an average value (PAQ+PA16)/2 of PAQ and PA16 or an average value (PAQ+PA64)/2 of PAQ and PA64, where PAQ, PA16 and PA64 are the power values of the average vectors AQ, A16 and A64 when a QPSK signal, a 16 QAM signal, and a 64 QAM signal are received under ideal conditions.

Alternatively, by simulation, experimentation or the like, an appropriate value which can distinguish the vector A16 or A64 from the vector AQ even when there is interference, may be selected as the threshold value. As an example, it is know that, in an environment having AWGN (Additive White Gaussian Noise), effective distinguishing can be achieved when 0.26 is selected as the threshold value. The threshold value comparing section 64 outputs the determination result to the modulation scheme determining section 58.

Also, the 16 QAM region determining section 66, the average vector calculating section 67, the power calculating section 68 and the threshold value comparing section 69 of FIG. 4 determines which of 16 QAM and 64 QAM a carrier modulation scheme is. The 16 QAM region determining section 66 determines whether or not the components (I, Q) of a signal point of a carrier input to the modulation scheme estimating section 24 satisfy a condition of $|I| \leq 1/\sqrt{10}$ and $|Q| \leq 1/\sqrt{10}$. Specifically, it is determined whether or not a signal point of a carrier input from the absolute value calculating section 52 falls within a region S2 (a region of $0 \leq I \leq 1/\sqrt{10}$ and $0 \leq Q \leq 1/\sqrt{10}$) of FIGS. 6 and 7, and the determination result is output to the average vector calculating section 67.

The average vector calculating section 67 calculates average values ave(|I|) and ave(|Q|) of |I| and |Q| supplied from the absolute value calculating section 52 for carriers which are determined in the 16 QAM region determining section 66 to satisfy the condition of $|I| \leq 1/\cdot 10$ and $|Q| \leq 1/\sqrt{10}$ (in this case, the average may be obtained over a plurality of symbols), and outputs the calculated ave(|I|) and ave(|Q|) to the power calculating section 68. The power calculating section 68 calculates the squared sum $(\text{ave}(|I|))^2 + (\text{ave}(|Q|))^2$ of the ave(|I|) and the ave(|Q|) supplied from the average vector calculating section 67, and outputs the squared sum $(\text{ave}(|I|))^2 + (\text{ave}(|Q|))^2$ to the threshold value comparing section 69.

The process so far described corresponds to determination of vectors having end points present within the region of $|I| < 1/\sqrt{10}$ and $|Q| \leq 1/\sqrt{10}$ among vectors (position vectors having a start point at the origin O(0, 0)) indicating signal points of the waveform-equalized OFDM signal supplied to the modulation scheme estimating section 24, and calculation of the power of an average vector (a position vector having a start point at the origin O(0, 0) and an end point at (ave(|I|), ave(|Q|))) of these vectors.

Here, the calculation result of the average vector calculating section 67 when a modulation scheme of carriers supplied to the modulation scheme estimating section 24 is 16 QAM or 64 QAM, will be respectively described.

FIG. 12(a) is a diagram illustrating an ideal signal point in the region S2 when carriers are modulated by 16 QAM. FIG. 12(b) is a diagram illustrating a range in which signal points of actually received carriers are present when the carriers are modulated by 16 QAM. FIG. 12(c) is a diagram illustrating an average vector of the actually received carriers.

Initially, assuming that carriers are modulated by 16 QAM, when the influence of interference is substantially negligible, the coordinates of a signal point output from the absolute value calculating section 52 are $(I, Q) = (1/\sqrt{10}, 1/\sqrt{10})$. A vector connecting the origin O and the signal point is, for example, a vector T16' of FIG. 12(a).

On the other hand, when there is an influence of noise or the like, the signal point output from the absolute value calculating section 52 is deviated from the ideal signal point $(1/\sqrt{10}, 1/\sqrt{10})$. A vector connecting the origin O and the signal point affected by interference is, for example, a vector R16' of FIG. 12(b). The signal point thus affected by interference is distributed in a sector region S16' around the ideal signal point $(1/\sqrt{10}, 1/\sqrt{10})$ as the center. The average vector calculating section 67 obtains an average vector of vectors connecting the origin O and the respective signal points included in the region S2. As a result, the average vector is, for example, a vector A16' of FIG. 12(c).

FIG. 13(a) is a diagram illustrating an ideal signal point in the region S2 when carriers are modulated by 64 QAM. FIG. 13(b) is a diagram illustrating a range in which signal points of actually received carriers are present when the carriers are modulated by 64 QAM. FIG. 13(c) is a diagram illustrating an average vector of the actually received carriers.

Assuming that carriers are modulated by 64 QAM, when the influence of interference is substantially negligible, the coordinates of a signal point (in the region S2) output from the absolute value calculating section 52 are $(I, Q) = (1/\sqrt{42}, 1/\sqrt{42})$. A vector connecting the origin O and the signal point is, for example, a vector T64' of FIG. 13(a).

On the other hand, when there is an influence of noise or the like, the signal point output from the absolute value calculating section 52 is deviated from the ideal signal point $(1/\sqrt{42}, 1/\sqrt{42})$. A vector connecting the origin O and the signal point affected by interference is, for example, a vector R64' of FIG. 13(b). The signal point thus affected by interference is distributed in a region S64' around the ideal signal point $(1/\sqrt{42}, 1/\sqrt{42})$ as the center. The average vector calculating section 67 obtains an average vector of vectors connecting the origin O and the respective signal points included in the region S2. As a result, the average vector is, for example, a vector A64' of FIG. 13(c). The vector A64' is approximate to a vector connecting the origin O and the center of the region S2. Note that the result is not significantly affected by the degree of interference, such as C/N when the interference is noise, or the like.

Figure 14:
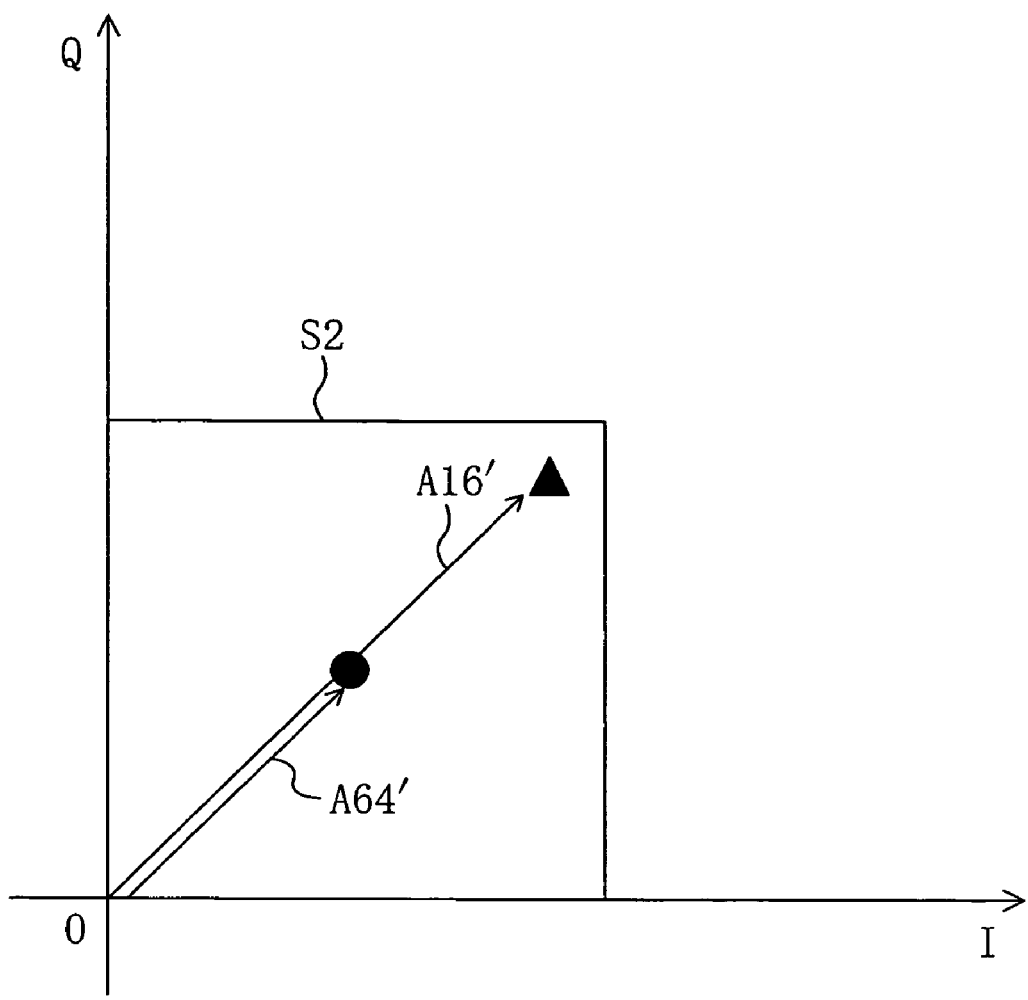
FIG. 14 is a diagram illustrating average vectors A16' and A64' obtained in an average vector calculating section of FIG. 4.

FIG. 14 is a diagram illustrating the average vectors A16' and A64' obtained in the average vector calculating section 67 of FIG. 4. It is indicated that there is a clear difference on the I-Q plane between the average vector A16' when carriers are modulated by 16 QAM and the average vector A64' when carriers are modulated by 64 QAM. Assuming that each of the vectors A16' and A64' is a position vector having a start point at the origin O (the end point of the position vector is a point having the average values ave(|I|) and ave(|Q|) obtained in the average vector calculating section 67 as the I-axis coordinate and the Q-axis coordinate), the difference can be easily determined from any of a distance from the origin to the coordinate point of each end point, the squared value (power value) of the distance, and the coordinates of the end point themselves.

Therefore, the threshold value comparing section 69 compares the power value output by the power calculating section 68 with a predetermined threshold value, and when the power value exceeds the threshold value, determines that a modulation scheme for the input carrier is 16 QAM, and when otherwise, determines that the modulation scheme is not 64 QAM.

The threshold value used here may be, for example, an average value (PA16'+PA64')/2 of PA16' and PA64', where PA16' and PA64' are the power values of the average vectors A16' and A64' when a 16 QAM signal and a 64 QAM signal are received under ideal conditions.

Alternatively, by simulation, experimentation or the like, an appropriate value which can distinguish the vector A16' from the vector A64' even when there is interference, may be selected as the threshold value. As an example, it is know that, in an environment having AWGN, effective distinguishing can be achieved when 0.06 is selected as the threshold value. The threshold value comparing section 69 outputs the determination result to the modulation scheme determining section 58.

Figure 15:
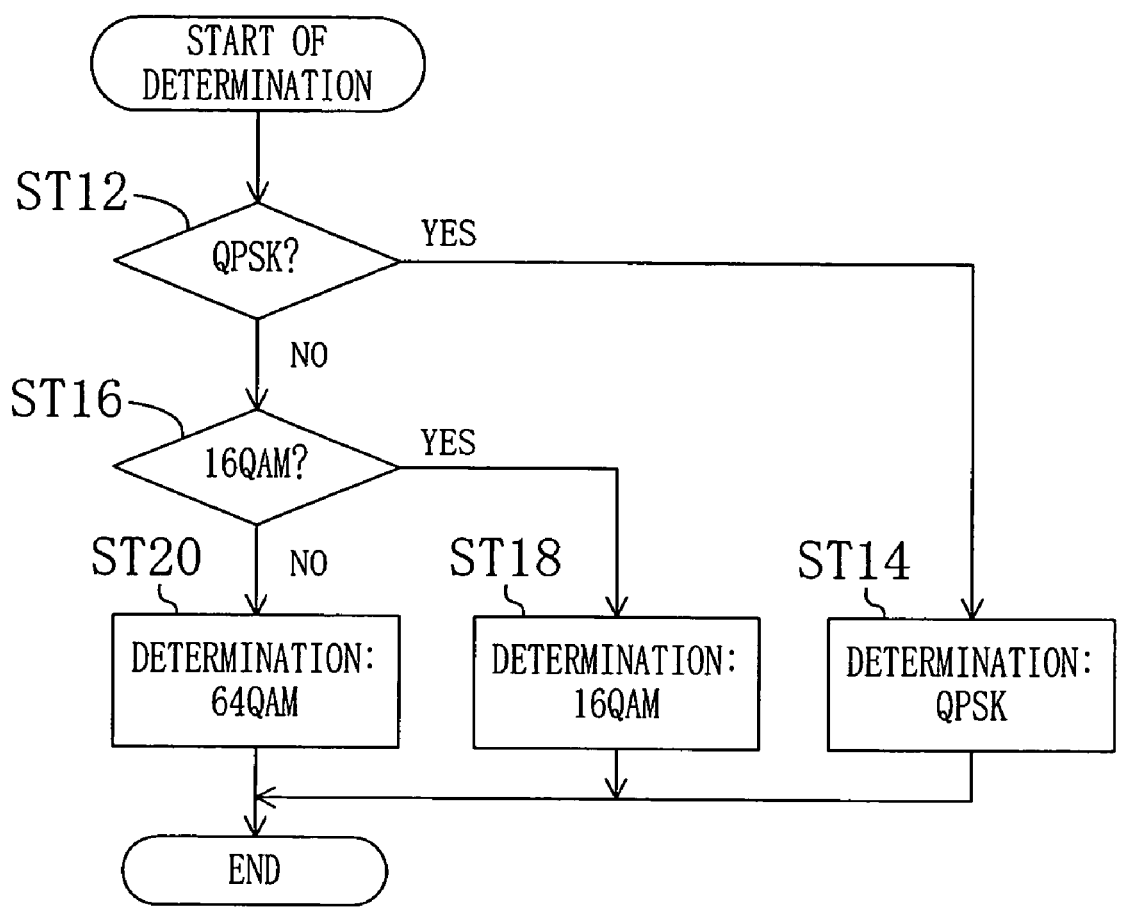
FIG. 15 is a flowchart illustrating a flow of a process in a modulation scheme determining section of FIG. 4.

FIG. 15 is a flowchart illustrating a flow of a process in the modulation scheme determining section 58 of FIG. 4. The modulation scheme determining section 58 determines a modulation scheme for a carrier input to the modulation scheme estimating section 24, in accordance with the flow of FIG. 15.

In step ST12, the modulation scheme determining section 58 initially determines whether or not a carrier modulation scheme is QPSK, based on the comparison result of the threshold value comparing section 64. When the comparison result of the threshold value comparing section 64 indicates QPSK, the process goes to step ST14. In step ST14, the modulation scheme determining section 58 determines that a modulation scheme for a carrier input to the modulation scheme estimating section 24 is QPSK.

On the other hand, when the comparison result of the threshold value comparing section 64 indicates that the modulation scheme is not QPSK, the process goes to step ST16. In step ST16, the modulation scheme determining section 58 determines whether or not the carrier modulation scheme is 16 QAM, based on the comparison result of the threshold value comparing section 69. When the comparison result of the threshold value comparing section 69 indicates 16 QAM, the process goes to step ST18. In step ST18, the modulation scheme determining section 58 determines that the modulation scheme for the carrier input to the modulation scheme estimating section 24 is 16 QAM.

When the comparison result of the threshold value comparing section 69 indicates that the modulation scheme is not 16 QAM, the process goes to step ST20. In step ST20, the modulation scheme determining section 58 determines that the modulation scheme for the carrier input to the modulation scheme estimating section 24 is 64 QAM. The determination result of the modulation scheme determining section 58 is output as the estimation result of the modulation scheme estimating section 24.

With the above-described configuration, the modulation scheme estimating section 24 can estimate a modulation scheme for an input carrier (of a center segment) until the result of waveform equalization corresponding to, for example, about 20 symbols is input.

Although it has been described in this embodiment, as an example, that the modulation scheme estimating section 24 estimates whether a carrier modulation scheme is QPSK, 16 QAM, or 64 QAM, it is possible to estimate other modulation schemes, such as other multilevel QAMs and the like, using a similar process.

Also, in this embodiment, a modulation scheme is estimated from the magnitude or power value of an average vector obtained in the average vector calculating sections 62 and 67, in the modulation scheme estimating section 24. Instead of this, a modulation scheme may be estimated, depending on whether or not the coordinates of the end point of the average vector obtained in the average vector calculating sections 62 and 67, i.e., the average values ave(|I|) and ave(|Q|) obtained in the average vector calculating sections 62 and 67, all fall within predetermined ranges.

Also, according to the partial reception determining section 20, since determination precision is secured within predetermined reception conditions, the process of obtaining TMCC information (a partial reception flag) about the presence or absence of a partial reception portion can be omitted and a circuit for the process can be removed.

Also, although this embodiment has been described, assuming that the frequency deinterleaving section 32 and the time deinterleaving section 34 are separate parts, since both of them reset interleaving in units of a carrier, they may be integrated together and configured to perform deinterleaving. The same is true of other embodiments described below.

Also, the power calculating sections 63 and 68 may obtain the amplitude of the average vector, and the threshold value comparing sections 64 and 69 may compare the obtained average vector amplitude with a predetermined threshold value.

As described above, the OFDM reception apparatus of this embodiment determines the presence or absence of a partial reception portion without waiting for obtaining of a partial reception flag in TMCC information. Therefore, the frequency deinterleaving process can be started at an early stage, thereby making it possible to shorten a time from the start of reception by a reception apparatus to the output of video, audio or the like.

Second Embodiment

Figure 16:
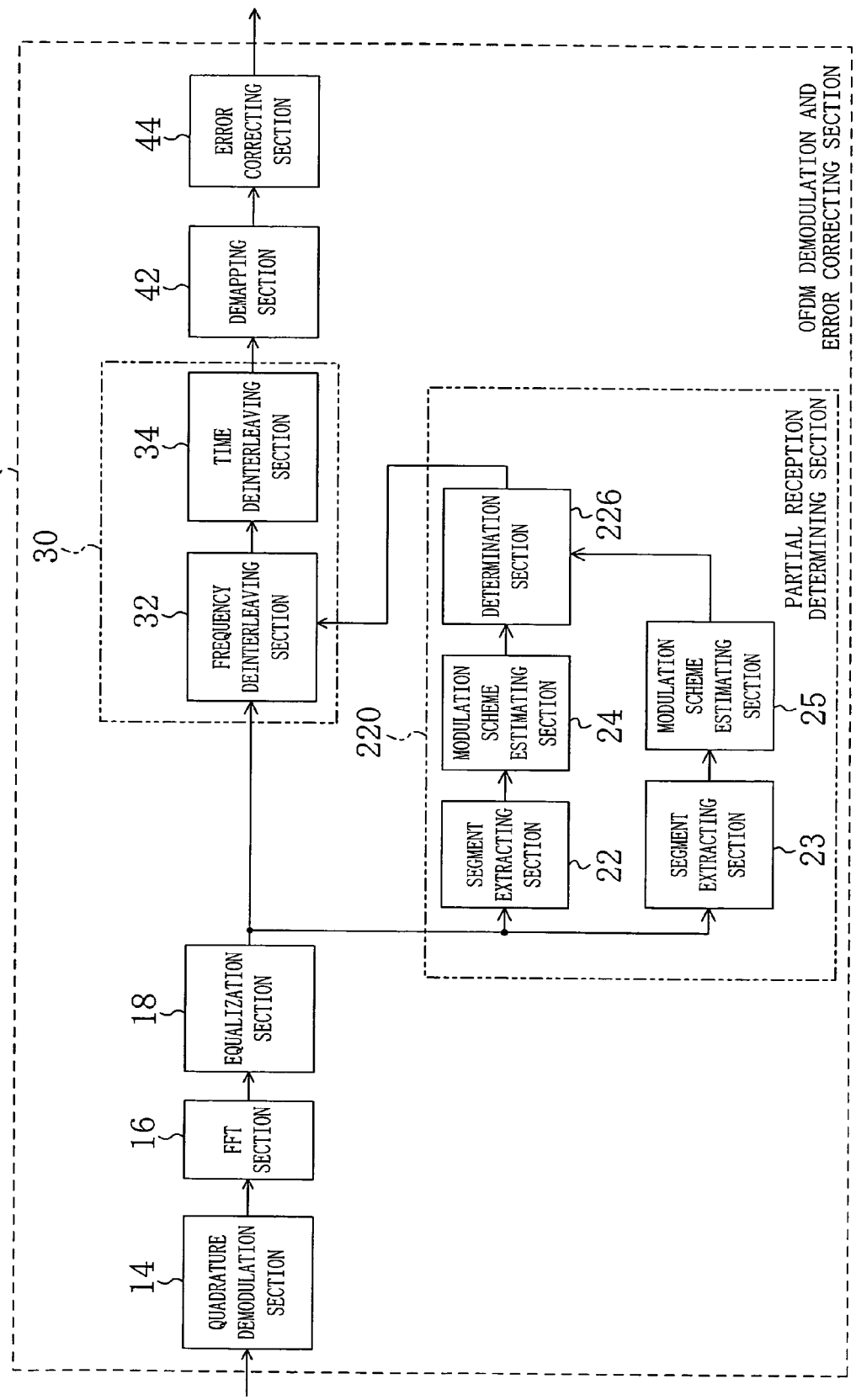
FIG. 16 is a block diagram illustrating an exemplary configuration of an OFDM demodulation and error correcting section according to a second embodiment of the present invention.

FIG. 16 is a block diagram illustrating an exemplary configuration of an OFDM demodulation and error correcting section 204 according to a second embodiment of the present invention. In the second embodiment, in the OFDM reception apparatus of FIG. 1, the OFDM demodulation and error correcting section 204 is used instead of the OFDM demodulation and error correcting section 4. The OFDM demodulation and error correcting section 204 of FIG. 16 is different from the OFDM demodulation and error correcting section 4 of FIG. 2 in that a partial reception determining section 220 is provided instead of the partial reception determining section 20. The other parts are similar to those described with reference to FIG. 2 and are indicated with the same reference numerals, and will not be described.

In ISDB-T, when a partial reception service is performed, it is highly likely that QPSK or 16 QAM is selected as a modulation scheme for a partial reception portion (i.e., a center segment), and 64 QAM is selected as a modulation scheme for the other segments (i.e., non-center segments). In other words, it is highly likely that there is a difference between modulation schemes for the center segment and the non-center segments.

Therefore, the partial reception determining section 220 of this embodiment estimates, based on a waveform-equalized OFDM signal supplied from the equalization section 18, modulation schemes for carriers thereof, and based on the estimation result, compares a modulation scheme for a plurality of carriers belonging to the center segment with a modulation scheme for a plurality of carriers belonging to the non-center segments. If there is a difference between them, the partial reception determining section 220 determines that "there is a partial reception portion". If there is not a difference between them, the partial reception determining section 220 determines that "there is not a partial reception portion". Thereafter, the frequency deinterleaving section 32 performs a frequency deinterleaving process, depending on the determination result of the partial reception determining section 220.

As illustrated in FIG. 16, the partial reception determining section 220 comprises segment extracting sections 22 and 23, modulation scheme estimating sections 24 and 25, and a determination section 226. The segment extracting section 22 extracts a carrier belonging to the center segment from a waveform-equalized OFDM signal supplied from the equalization section 18, and outputs the carrier to the modulation scheme estimating section 24. The modulation scheme estimating section 24 estimates a modulation scheme for the carrier belonging to the center segment supplied from the segment extracting section 22, and outputs the estimation result to the determination section 226.

The segment extracting section 23 extracts carriers belonging to the non-center segments (12 segments having segment numbers 1 to 12) from the waveform-equalized OFDM signal supplied from the equalization section 18, and outputs the carriers to the modulation scheme estimating section 25. The modulation scheme estimating section 25 estimates a modulation scheme for the carriers belonging to the non-center segments supplied from the segment extracting section 23, and outputs the estimation result to the determination section 226. The modulation scheme estimating section 25 has substantially the same configuration as that of the modulation scheme estimating section 24 which has been described with reference to FIG. 4, and will not be here described in detail.

The determination section 226 determines the presence or absence of a hierarchical layer for partial reception, based on the results of estimation of the modulation scheme for the carrier belonging to the center segment and the modulation scheme for the carriers belonging to the non-center segments which are supplied from the modulation scheme estimating sections 24 and 25, respectively. Specifically, the determination section 226 compares the result of estimation of the modulation scheme for the carrier belonging to the center segment with the result of estimation of the modulation scheme for the carriers belonging to the non-center segments, and determines that "there is a partial reception portion" when both the modulation schemes are different, and that "there is not a partial reception portion" when both the modulation schemes are the same.

For example, when the result of estimation of the modulation scheme for the carrier belonging to the center segment which is supplied from the modulation scheme estimating section 24, is "QPSK", and the result of estimation of the modulation scheme for the carriers belonging to the non-center segments which is supplied from the modulation scheme estimating section 25, is "64 QAM", the modulation schemes are different from each other, so that the determination section 226 determines that "there is a partial reception portion". Also, for example, when the results of estimation of the modulation scheme for the center segment and the modulation scheme for the non-center segments are both 64 QAM, the modulation schemes are not different from each other, the determination section 226 determines that "there is not a partial reception portion". The determination result of the determination section 226 is output as an output of the partial reception determining section 220 to the frequency deinterleaving section 32.

As described above, the OFDM reception apparatus of FIG. 16 determines the presence or absence of a partial reception portion without obtaining of a partial reception flag in TMCC information. Therefore, the frequency deinterleaving process can be started at an early stage, thereby making it possible to shorten the time from the start of reception by a reception apparatus to the output of video, audio or the like.

Although it has been described that the segment extracting section 23 of the partial reception determining section 220 outputs carriers belonging to 12 segments having segment numbers 1 to 12 (non-center segments) to the modulation scheme estimating section 25, segments from which carriers are output are not limited to these. A carrier belonging to an arbitrary segment belonging to the non-center segments may be output to the modulation scheme estimating section 25. For example, only carriers belonging to segments having segment numbers 1 and 2 adjacent to the center segment on a transmitted spectrum may be output to the modulation scheme estimating section 25. In this case, power consumption required for calculation can be reduced without a significant deterioration in estimation precision.

Also, although it has been described that the partial reception determining section 220 comprises the modulation scheme estimating sections 24 and 25, a single modulation scheme estimating section may be provided instead of the modulation scheme estimating sections 24 and 25, and the modulation scheme estimating section may be operated in a manner similar to those of the modulation scheme estimating sections 24 and 25.

Also, in this embodiment, for the sake of convenience, it has been described that the partial reception determining section 220 comprises the modulation scheme estimating sections 24 and 25, the modulation scheme estimating section 24 estimates a modulation scheme for the center segment and the modulation scheme estimating section 25 estimates a modulation scheme for the non-center segment. Instead of this, the partial reception determining section 220 may comprise a single modulation scheme estimating section instead of the modulation scheme estimating sections 24 and 25, and the single modulation scheme estimating section may be operated in a manner similar to those of the modulation scheme estimating sections 24 and 25, i.e., the single modulation scheme estimating section may estimate modulation schemes for the center segment and the non-center segment. Also in this case, the determination section 226 can determine the presence or absence of a hierarchical layer for partial reception, based on the estimation result of the single modulation scheme estimating section, i.e., comparison between the modulation scheme for the center segment and the modulation scheme for the non-center segment.

Third Embodiment

Figure 17:
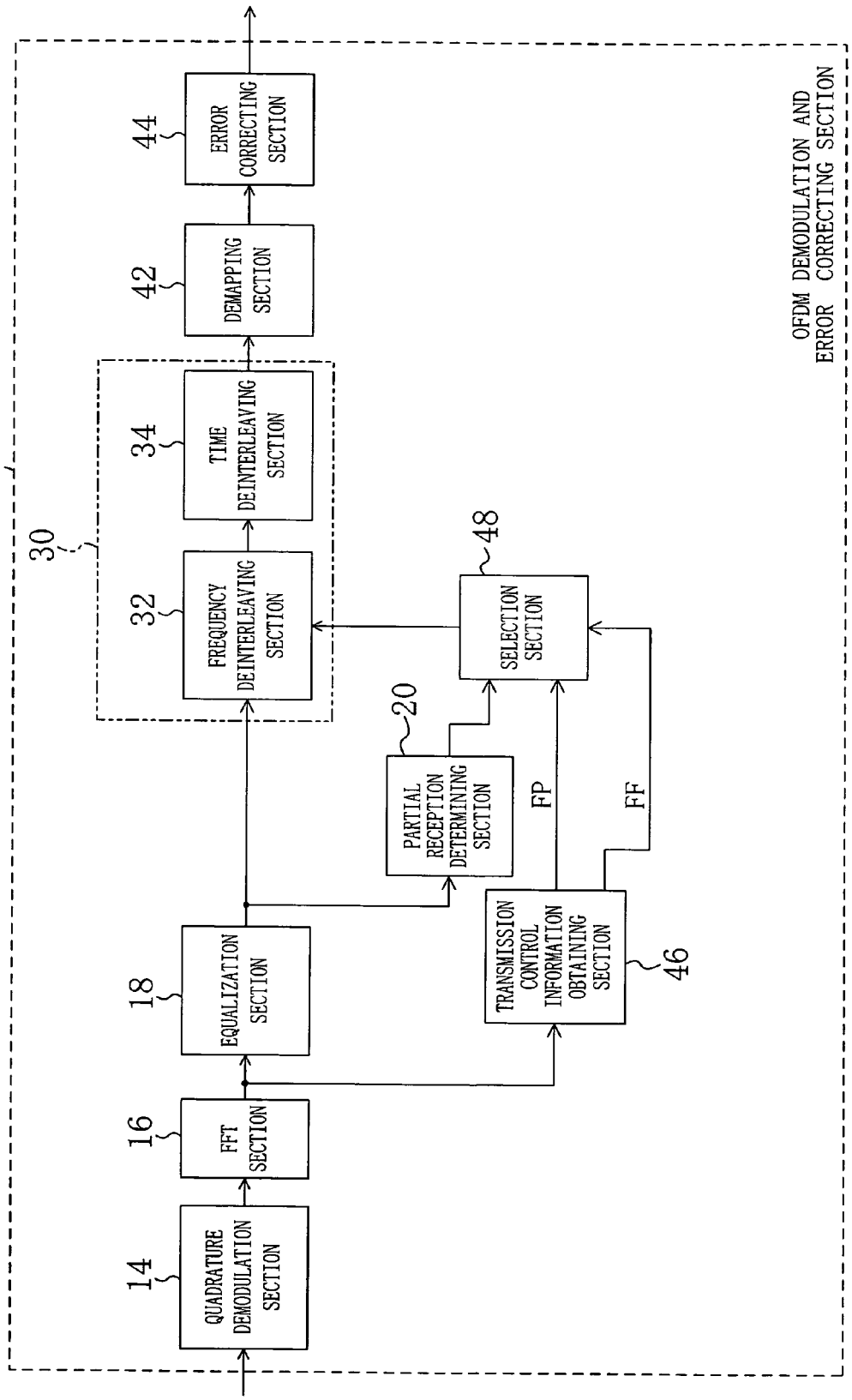
FIG. 17 is a block diagram illustrating an exemplary configuration of an OFDM demodulation and error correcting section according to a third embodiment of the present invention.

FIG. 17 is a block diagram illustrating an exemplary configuration of an OFDM demodulation and error correcting section 304 according to a third embodiment of the present invention. In third embodiment, in the OFDM reception apparatus of FIG. 1, the OFDM demodulation and error correcting section 304 is used instead of the OFDM demodulation and error correcting section 4. The OFDM demodulation and error correcting section 304 of FIG. 17 is different from the OFDM demodulation and error correcting section 4 of FIG. 2 in that a transmission control information obtaining section 46 and a selection section 48 are further provided. The other parts are similar to those described with reference to FIG. 2 and are indicated with the same reference numerals, and will not be described.

The transmission control information obtaining section 46 receives a frequency-domain OFDM signal from the FFT section 16, decodes and obtains various kinds of transmission control information (TMCC information in ISDB-T), such as a modulation scheme, a coding rate and the like, required for demodulation and error correction processes, and outputs the obtained information about the presence or absence of a partial reception portion (i.e., a partial reception flag FP) to the selection section 48. Also, the transmission control information obtaining section 46 outputs a flag FF (hereinafter referred to as an "obtaining completion flag") indicating whether or not obtaining of the partial reception flag FP has been completed, to the selection section 48. The partial reception determining section 20 determines the presence or absence of a partial reception portion based on the result of waveform equalization obtained in the equalization section 18, and outputs the determination result to the selection section 48.

When the obtaining completion flag FF obtained by the transmission control information obtaining section 46 indicates that the obtaining of the partial reception flag FP has not been completed, the selection section 48 selects the determination result about the presence or absence of a partial reception portion which is output by the partial reception determining section 20. When the obtaining completion flag FF indicates that the obtaining of the partial reception flag FP has been completed, the selection section 48 selects the partial reception flag FP output by the transmission control information obtaining section 46, and outputs the selection result, i.e., information about the presence or absence of a partial reception portion, to the frequency deinterleaving section 32.

Based on the information about the presence or absence of a partial reception portion which is output from the selection section 48, the frequency deinterleaving section 32 performs a frequency deinterleaving process with respect to an OFDM signal output from the equalization section 18, and outputs the process result to the time deinterleaving section 34.

In the ISDB-T standards, it is designed that TMCC carriers have a considerably high level of resistance to interference on a transmission channel, and an error correction process can be performed with respect to TMCC information. Therefore, reliability with respect to the decoding result is considerably high. Therefore, in this embodiment, the determination result of the partial reception portion 20 which can obtain the determination result at an early stage is used before the obtaining of the partial reception flag FP (transmission control information) is completed, and after the obtaining of the partial reception flag FP is completed, a value of the partial reception flag FP is used to perform frequency deinterleaving, depending on the presence or absence of a partial reception portion.

Therefore, when there is a relatively small influence of interference on a transmission channel, the partial reception determining section 20 is used to estimate the presence or absence of a partial reception portion at an early stage, thereby making it possible to shorten a time until video, audio or the like is output. In addition, even under a transmission channel environment such that an error occurs in the estimation of the partial reception portion 20, since the partial reception flag FP obtained as transmission control information can be referenced, it is possible to more correctly obtain information about the presence or absence of a partial reception portion.

Note that, in this embodiment, the obtaining completion flag FF indicating the capturing/completion of transmission control information, may indicate the completion of obtaining only the partial reception flag FP, or the completion of obtaining the whole transmission control information.

Also, in this embodiment, the partial reception determining section 220 of FIG. 16 may be used instead of the partial reception determining section 20.

Fourth Embodiment

Figure 18:
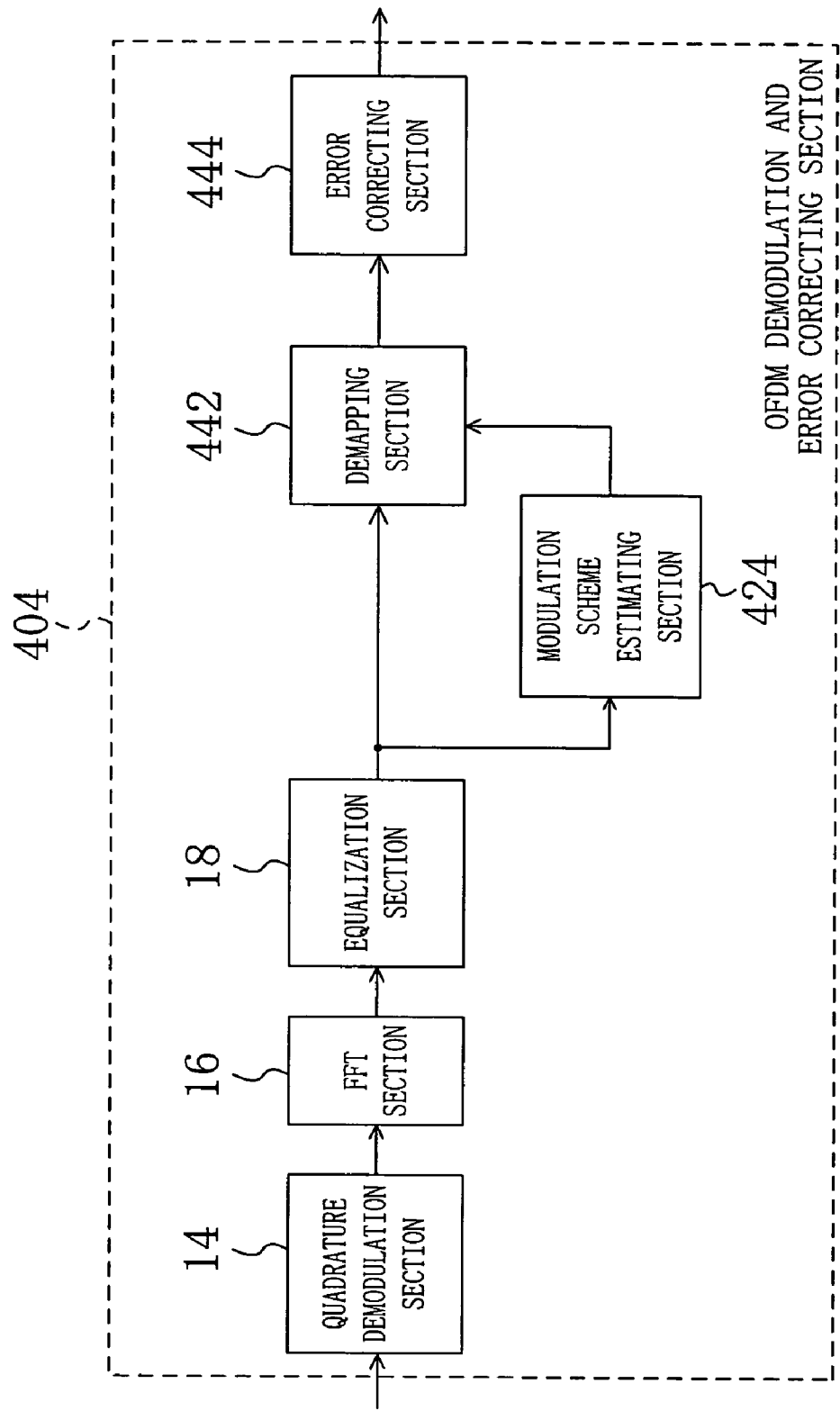
FIG. 18 is a block diagram illustrating an exemplary configuration of an OFDM demodulation and error correcting section according to a fourth embodiment of the present invention.

FIG. 18 is a block diagram illustrating an exemplary configuration of an OFDM demodulation and error correcting section 404 according to a fourth embodiment of the present invention. In the fourth embodiment, in the OFDM reception apparatus of FIG. 1, the OFDM demodulation and error correcting section 404 is used instead of the OFDM demodulation and error correcting section 4. The OFDM demodulation and error correcting section 404 of FIG. 18 comprises a quadrature demodulation section 14, an FFT section 16, an equalization section 18, a modulation scheme estimating section 424, a demapping section 442, and an error correcting section 444. Parts similar to those described with reference to FIG. 2 are indicated with the same reference numerals and will not be described.

The equalization section 18 performs waveform equalization with respect to a distortion occurring in a frequency-domain OFDM signal on a transmission channel, and outputs the waveform-equalized OFDM signal to the modulation scheme estimating sections 424 and the demapping section 442. The modulation scheme estimating section 424 estimates a carrier modulation scheme from the input waveform-equalized OFDM signal, and outputs the estimation result to the demapping section 442. The modulation scheme estimating section 424 is assumed to have a configuration similar to that of the modulation scheme estimating section 24 described with reference to FIG. 4, and will not be described in detail.

Based on the result of estimation of the modulation scheme which is obtained in the modulation scheme estimating section 424, the demapping section 442 performs soft decision with respect to the waveform-equalized OFDM signal input from the equalization section 18, and outputs soft decision metric data to the error correcting section 444. The error correcting section 444 performs a process of resetting various kinds of interleaving, and an error correction decoding process (Viterbi decoding, RS decoding, etc.), and outputs the result.

According to the OFDM demodulation and error correcting section 404 of FIG. 18, the modulation scheme estimating section 424 can estimate a modulation scheme (e.g., any of QPSK, 16 QAM, and 64 QAM) based on a waveform-equalized carrier without obtaining information about a carrier modulation scheme which is transmitted as TMCC information in the case of, for example, ISDB-T as in conventional reception apparatuses, and by using the estimation result, the demapping section 442 can performs soft decision. Therefore, a time required to obtain transmission control information, such as TMCC information, is no longer required, thereby making it possible to shorten the time from the start of reception to the output of video, audio or the like.

Note that, according to the OFDM demodulation and error correcting section 404 of this embodiment, when an OFDM signal is received where it is assumed that the same modulation scheme is used for all data carriers in a transmission band, the precision of estimation of a carrier modulation scheme by the modulation scheme estimating section 424 is improved, resulting in a higher effect.

For example, in a 1-segment dedicated reception apparatus or the like which receives only the hierarchical layer A of a digital terrestrial audio broadcasting scheme (ISDB-TSB) adopted in Japan or a partial reception portion of ISDB-T, the same modulation scheme is used for all data carriers for an OFDM signal in a received band. Therefore, when such an apparatus is provided with the OFDM demodulation and error correcting section 404 as illustrated in FIG. 18, the time from the start of reception to the output of audio can be significantly reduced, as compared to conventional reception apparatuses in which information about a carrier modulation scheme is obtained from TMCC information.

Similarly, when DVB-T or DVB-H, which is an European digital terrestrial television broadcasting scheme, is received, the effect of applying the embodiment is obtained. In DVB-T or DVB-H, the same modulation scheme is used for OFDM signals in all bands, and information about the carrier modulation scheme is transmitted as transmission control information called TPS (Transmission Parameter Signalling). Also, when such an OFDM signal is received, the time from the start of reception to the output of video, audio or the like can be reduced, as compared to conventional reception apparatuses in which information about a carrier modulation scheme from TPS is obtained.

Also, although it has been described in the fourth embodiment that a carrier modulation scheme is estimated regarding an OFDM signal, a similar process can be performed even in the case of a transmission system using a single carrier (in this case, the FFT section is not required, and the equalization section may not be required). Specifically, vectors indicating signal points present in a predetermined region among signal points of a received carrier on the I-Q plane, are time-averaged to calculate an average vector, and an amplitude or the square of the amplitude of the average vector is compared with a predetermined threshold value, thereby making it possible to obtain the carrier modulation scheme and perform soft decision.

Fifth Embodiment

Figure 19:
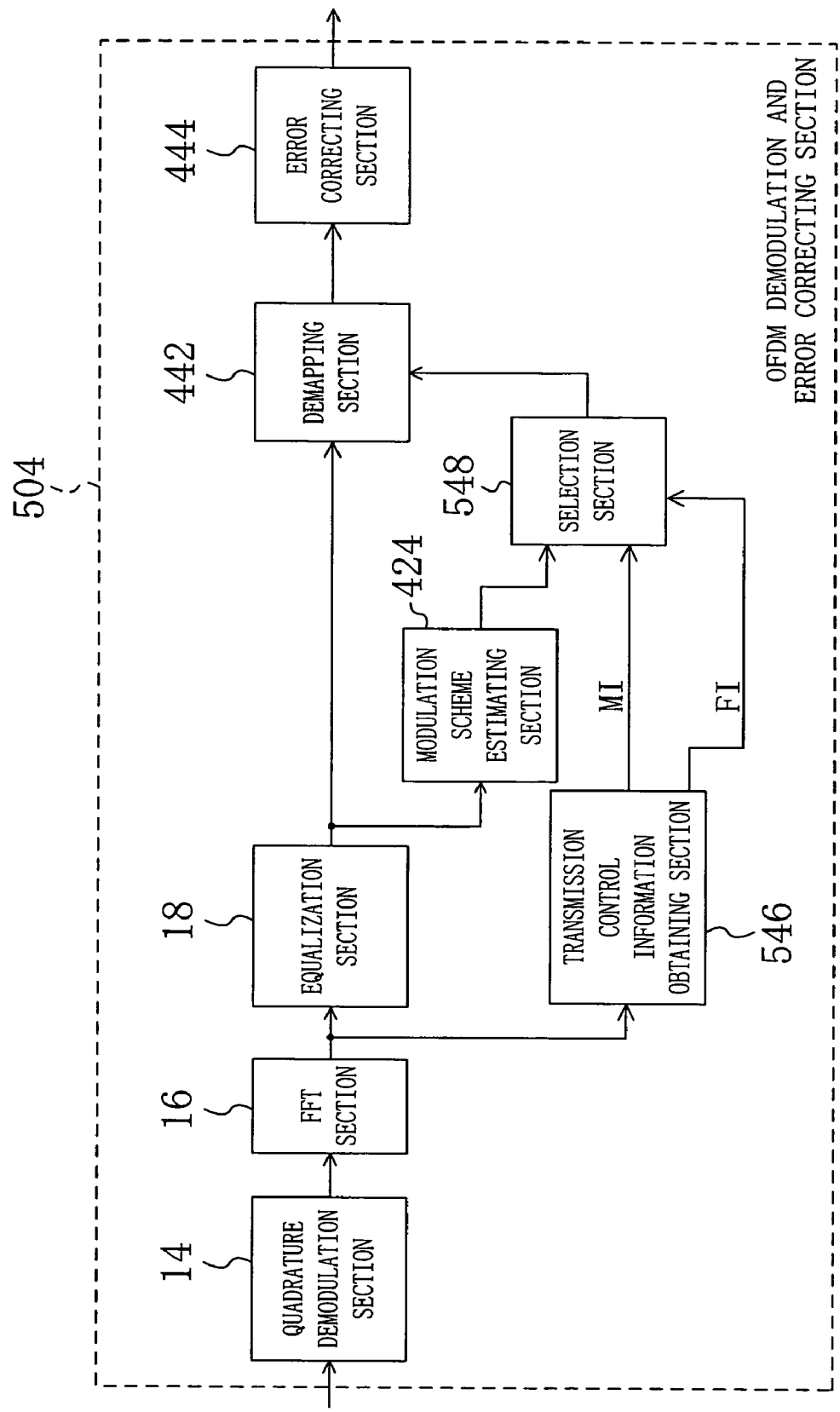
FIG. 19 is a block diagram illustrating an exemplary configuration of an OFDM demodulation and error correcting section according to a fifth embodiment of the present invention.

FIG. 19 is a block diagram illustrating an exemplary configuration of an OFDM demodulation and error correcting section 504 according to a fifth embodiment of the present invention. In the fifth embodiment, in the OFDM reception apparatus of FIG. 1, the OFDM demodulation and error correcting section 504 is used instead of the OFDM demodulation and error correcting section 4. The OFDM demodulation and error correcting section 504 of FIG. 19 is different from the OFDM demodulation and error correcting section 404 of FIG. 18 in that a transmission control information obtaining section 546 and a selection section 548 are further provided. The other parts are similar to those described with reference to FIGS. 2 and 18 and are indicated with the same reference numerals, and will not be described.

The transmission control information obtaining section 546 obtains various kinds of transmission control information (e.g., TMCC information in ISDB-T, TPS information in DVB-T, etc.), such as a modulation scheme, a coding rate and the like, required for demodulation and error correction processes from a frequency-domain OFDM signal supplied from the FFT section 16, and outputs information MI about a carrier modulation scheme to the selection section 548. Also, the transmission control information obtaining section 546 outputs a flag (obtaining completion flag FI) indicating whether or not the obtaining of the information MI about a carrier modulation scheme and the like has been completed, to the selection section 548.

The equalization section 18 outputs the result of waveform equalization to the modulation scheme estimating section 424 and the demapping section 442. The modulation scheme estimating section 424 estimates a carrier modulation scheme from the input waveform-equalized OFDM signal, and outputs the estimation result to the selection section 548.

When the obtaining completion flag FI obtained from the transmission control information obtaining section 546 indicates that the obtaining of the information MI about a carrier modulation scheme has not been completed, the selection section 548 selects the estimation result of the modulation scheme estimating section 424. Conversely, when the obtaining completion flag FI indicates that the obtaining of the information MI about a carrier modulation scheme has been completed, the selection section 548 selects the information MI about a carrier modulation scheme which is supplied from the transmission control information obtaining section 546. The selection section 548 outputs the selection result to the demapping section 442.

Based on the selection result supplied from the selection section 548, the demapping section 442 performs soft decision with respect to the waveform-equalized OFDM signal supplied from the equalization section 18, and outputs soft decision metric data to the error correcting section 444.

In the ISDB-T standards, the reliability with respect to the obtained TMCC information is considerably high. Therefore, this embodiment is characterized in that information about a carrier modulation scheme which is obtained by the modulation scheme estimating section 424 with which an estimation result is obtained at an early stage, is used before the obtaining of information about a carrier modulation scheme transmitted as transmission control information (TMCC information, etc.) is completed, and after the obtaining of the transmission control information is completed, the information obtained as the transmission control information is used to perform demapping, depending on the carrier modulation scheme.

Therefore, when there is a relatively small influence of interference on a transmission channel, the modulation scheme estimating section 424 is used to estimate a carrier modulation scheme at an early stage, thereby making it possible to shorten the time until video, audio or the like is output. In addition, even under a transmission channel environment such that an error occurs in the estimation of the modulation scheme estimating section 424, the information MI about the carrier modulation scheme which is obtained as transmission control information, can be used, thereby making it possible to obtain more correct information about the carrier modulation scheme.

Note that, in this embodiment, the obtaining completion flag FI indicating the completion of obtaining transmission control information, may indicate the completion of obtaining only the information MI about a carrier modulation scheme, or the completion of obtaining the whole transmission control information.

Note that, as is similar to the fourth embodiment, this embodiment can also be applied to a 1-segment dedicated reception apparatus which receives only the hierarchical layer A of ISDB-$T_{SB}$ or the partial reception portion of ISDB-T, a reception apparatus for DVB-T or DVB-H, and the like. According to this embodiment, the time from the start of reception to the output of video, audio or the like can be reduced, as compared to conventional reception apparatuses in which information about a carrier modulation scheme is obtained from transmission control information, such as TMCC information, TPS or the like.

Sixth Embodiment

Figure 20:
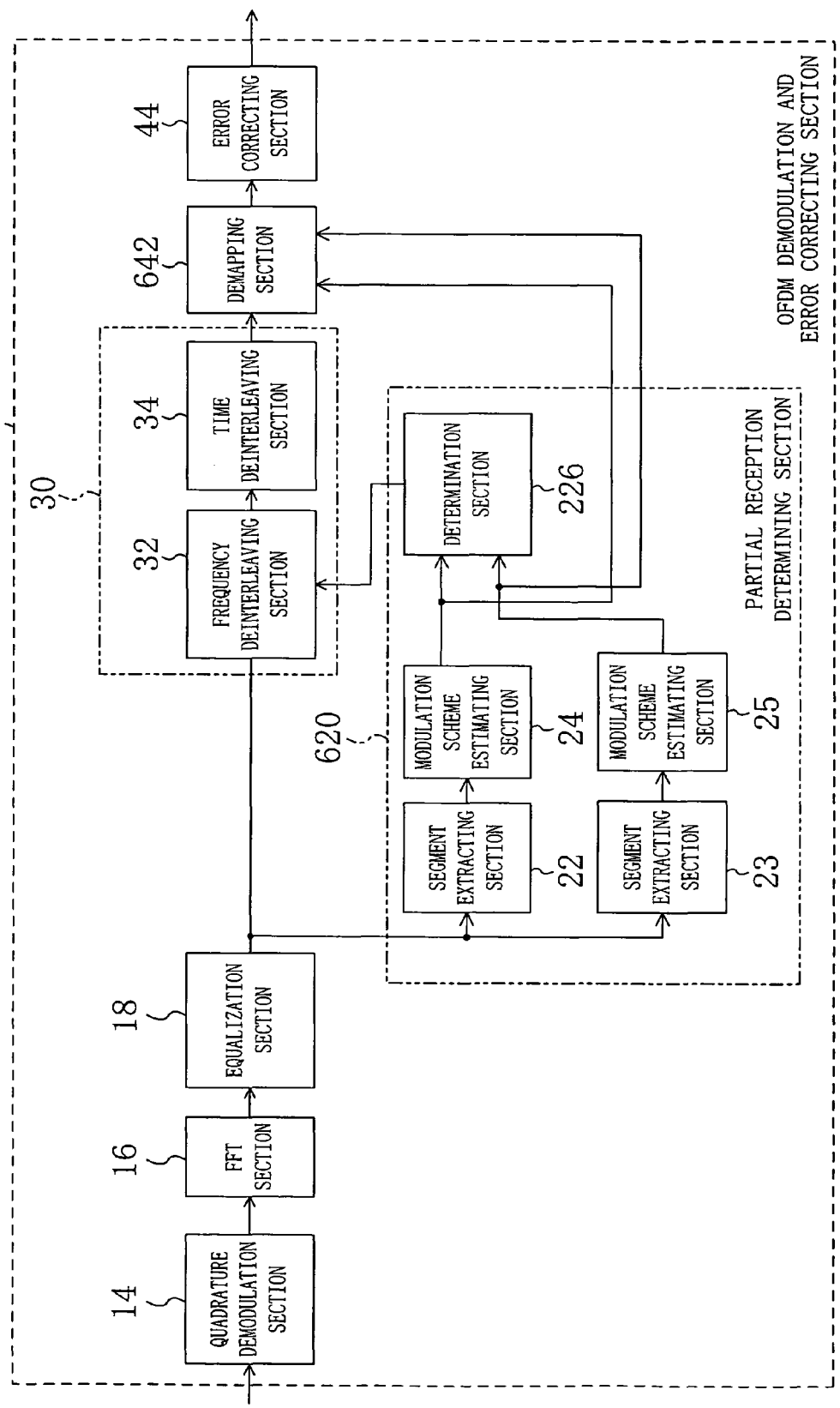
FIG. 20 is a block diagram illustrating an exemplary configuration of an OFDM demodulation and error correcting section according to a sixth embodiment of the present invention.

FIG. 20 is a block diagram illustrating an exemplary configuration of an OFDM demodulation and error correcting section 604 according to a sixth embodiment of the present invention. In the sixth embodiment, in the OFDM reception apparatus of FIG. 1, the OFDM demodulation and error correcting section 604 is used instead of the OFDM demodulation and error correcting section 4. The OFDM demodulation and error correcting section 604 of FIG. 20 is different from the OFDM demodulation and error correcting section 204 of FIG. 16 in that the partial reception determining section 620 is provided instead of the partial reception determining section 220, and the demapping section 642 is provided instead of the demapping section 42. The other parts are similar to those described with reference to FIGS. 2 and 16 and are indicated with the same reference numerals, and will not be described.

The equalization section 18 outputs the result of waveform equalization to the partial reception determining section 620 and the frequency deinterleaving section 32. The partial reception determining section 620 has substantially the same configuration as that of the partial reception determining section 220 of FIG. 16, except that a signal indicating a modulation scheme for a center segment and a modulation scheme for a non-center segment is output to the outside.

The determination section 226 outputs the result of determination of the presence or absence of a hierarchical layer for partial reception to the frequency deinterleaving section 32. The modulation scheme estimating section 24 obtains and outputs a modulation scheme for the center segment to the demapping section 642. The modulation scheme estimating section 25 obtains and outputs a modulation scheme for the non-center segment to the demapping section 642.

The demapping section 642 performs soft decision with respect to a waveform-equalized OFDM signal supplied from the equalization section 18, and outputs soft decision metric data to the error correcting section 44. Here, the demapping section 642 performs soft decision with respect to carriers of the center segment and the non-center segment, based on the results of estimation of a modulation scheme which are obtained by the modulation scheme estimating sections 24 and 25, respectively.

According to the OFDM demodulation and error correcting section 604 of FIG. 20, frequency deinterleaving is performed based on the result of determination of the presence or absence of a partial reception portion by the partial reception determining section 620, and soft decision is performed by the demapping section 642 based on the result of estimation of a modulation scheme by the partial reception determining section 620, without obtaining information about the presence or absence of a partial reception portion and information about a carrier modulation scheme which are transmitted by a received signal (e.g., as TMCC information in ISDB-T). Therefore, a time required to obtain the TMCC information is no longer required, thereby making it possible to shorten the time from the start of reception to the output of video, audio or the like.

Note that, also regarding this embodiment, as described with reference to FIG. 17 or the like, a transmission control information obtaining section and a selection section may be provided, and information about the presence or absence of a partial reception portion and information about a modulation scheme which are obtained in the partial reception determining section 620, information obtained from TMCC information or the like, may be selected as appropriate.

Also, it has been described in this embodiment that the partial reception determining section 620 detects a difference between modulation schemes for the center segment and the non-center segment to determine the presence or absence of a partial reception portion. Instead of this, the partial reception portion 20 described in the first embodiment may be similarly used and the result of estimation of a modulation scheme which is obtained in the partial reception portion 20, may be utilized. In this case, when two or more hierarchical layers having different modulation schemes are transmitted, the modulation schemes cannot be estimated. However, when the same modulation scheme is used for all segments in a transmission band, the modulation scheme or the presence or absence of a partial reception portion can be estimated, so that a time required to obtain a partial reception flag or a modulation scheme using TMCC information is no longer required. Therefore, also in this case, it is possible to shorten the time from the start of reception to the output of video, audio or the like.

Seventh Embodiment

Figure 21:
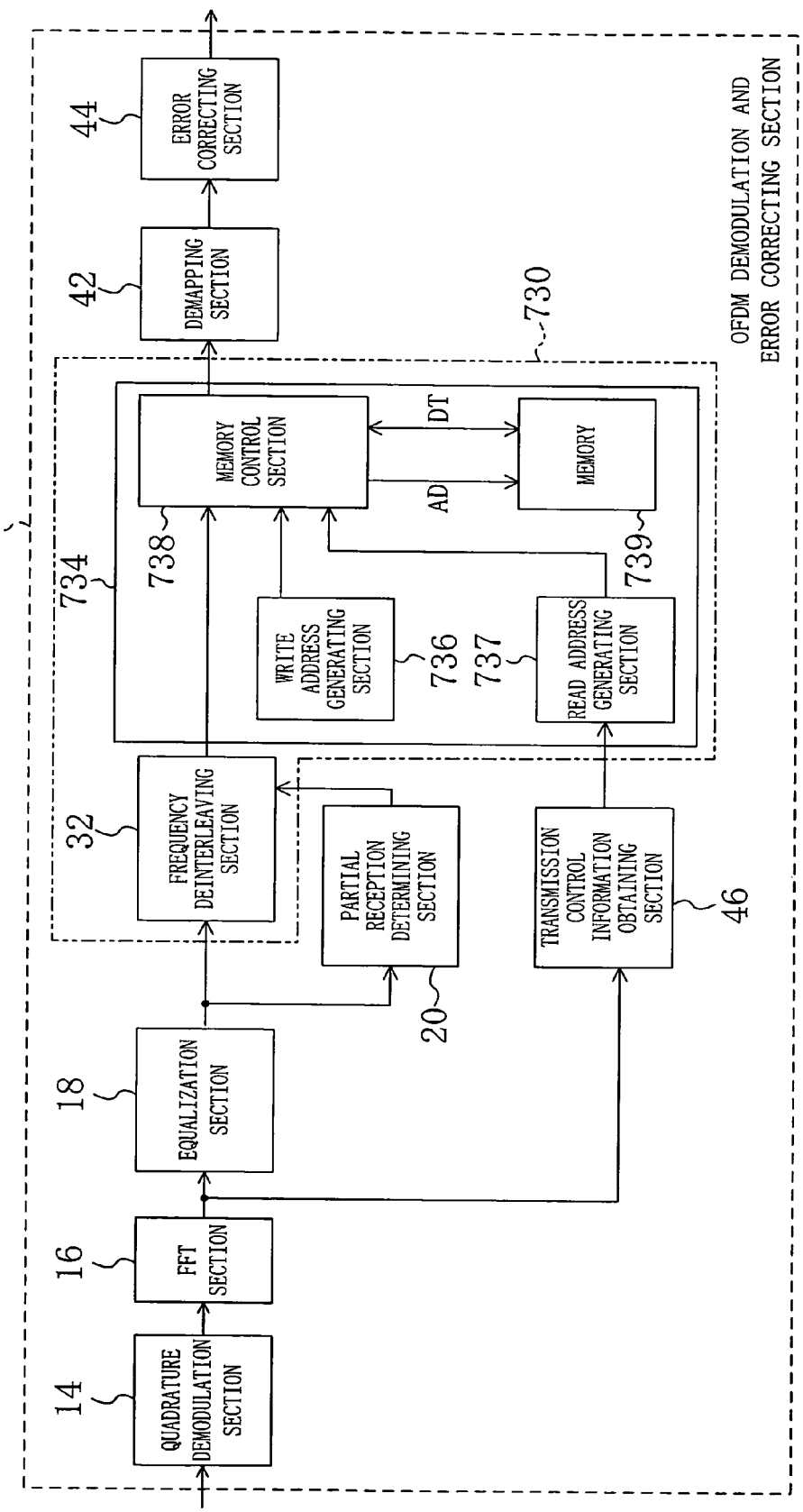
FIG. 21 is a block diagram illustrating an exemplary configuration of an OFDM demodulation and error correcting section according to a seventh embodiment of the present invention.

FIG. 21 is a block diagram illustrating an exemplary configuration of an OFDM demodulation and error correcting section 704 according to a seventh embodiment of the present invention. In the seventh embodiment, in the OFDM reception apparatus of FIG. 1, the OFDM demodulation and error correcting section 704 is used instead of the OFDM demodulation and error correcting section 4. The OFDM demodulation and error correcting section 704 of FIG. 21 is different from the OFDM demodulation and error correcting section 4 of FIG. 2 in that a deinterleaving section 730 is provided instead of the deinterleaving section 30, and a transmission control information obtaining section 46 is further provided. The other parts are similar to those described with reference to FIG. 2 and are indicated with the same reference numerals, and will not be described.

The deinterleaving section 730 of FIG. 21 has a frequency deinterleaving section 32 and a time deinterleaving section 734. The transmission control information obtaining section 46 receives a frequency-domain OFDM signal from the FFT section 16, obtains various kinds of transmission control information (TMCC information in ISDB-T), such as a modulation scheme, a coding rate, and the like, required for demodulation and error correction processes, and outputs an obtained time interleaving length to the time deinterleaving section 734.

The frequency deinterleaving section 32 resets frequency interleaving (frequency deinterleaving) with respect to the output of the equalization section 18, based on the determination result supplied from the partial reception determining section 20, using methods respectively suitable for the case where there is a partial reception portion and the case where there is not a partial reception portion, and outputs the frequency-deinterleaved OFDM signal to the time deinterleaving section 734.

The time deinterleaving section 734 resets time interleaving (time deinterleaving) with respect to the frequency-deinterleaved OFDM signal supplied from the frequency deinterleaving section 32, depending on the time interleaving length supplied from the transmission control information obtaining section 46, and outputs the time-deinterleaved OFDM signal to the demapping section 42.

The time deinterleaving section 734 has a write address generating section 736, a read address generating section 737, a memory control section 738, and a memory 739. The write address generating section 736 generates an address for writing an OFDM signal supplied to the time deinterleaving section 734 into the memory 739, and outputs the write address to the memory control section 738. The write address generating section 736 starts generating a write address even when, at the start of reception operation, a time interleaving length has not been obtained by the transmission control information obtaining section 46, i.e., TMCC information about the time interleaving length is not yet correctly supplied to the time deinterleaving section 734.

The read address generating section 737 generates an address for reading out an OFDM signal as a time-deinterleaved OFDM signal from the memory 739, as a read address, and outputs the read address to the memory control section 738. The read address generating section 737 generates the read address based on the time interleaving length supplied from the transmission control information obtaining section 46.

The memory control section 738 outputs the write address and the read address supplied from the write address generating section 736 and the read address generating section 737, respectively, as addresses AD to the memory 739. Also, the memory control section 738 controls write of the OFDM signal supplied to the time deinterleaving section 734 as data DT to the memory 739 in accordance with the write address, and controls read of data DT from the memory 739 in accordance with the read address, and outputs the read data as a time-deinterleaved OFDM signal to the demapping section 42.

Figure 22:
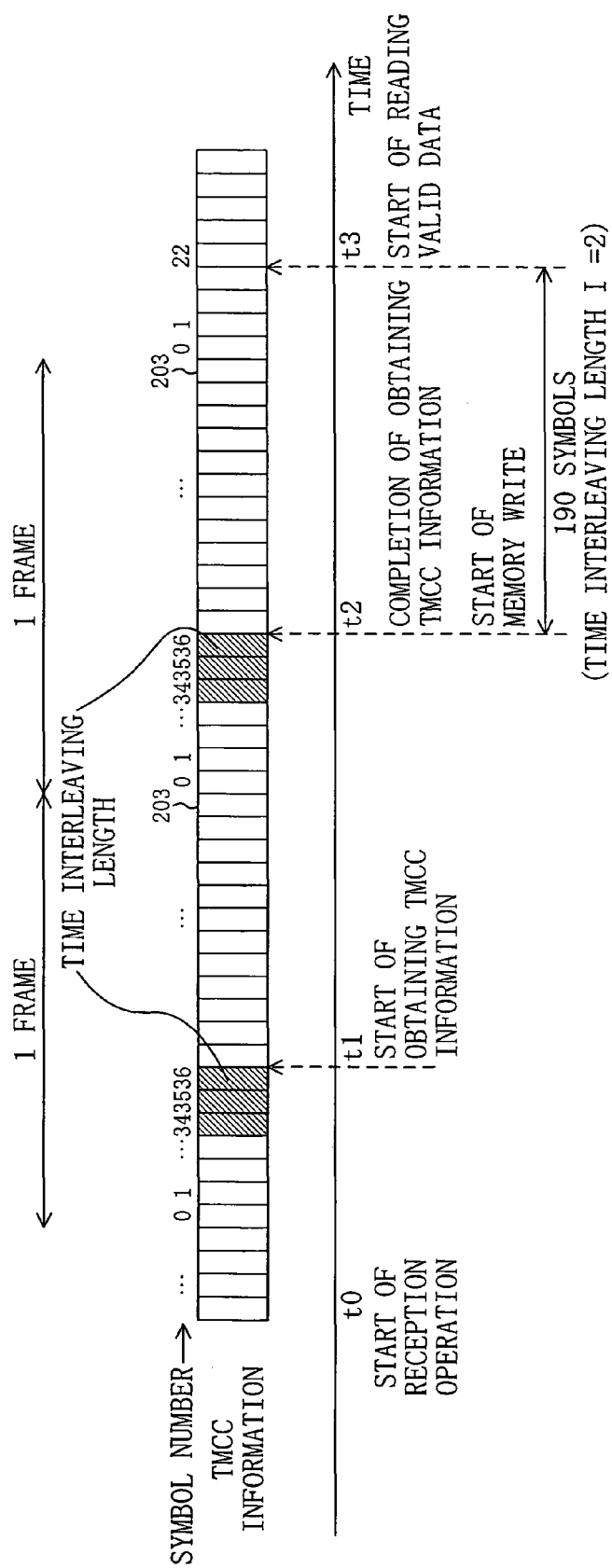
FIG. 22 is a timing chart illustrating a relationship between a state of obtaining of TMCC information and timing of resetting time deinterleaving when time interleaving is started after completion of the obtaining of TMCC information.
Figure 23:
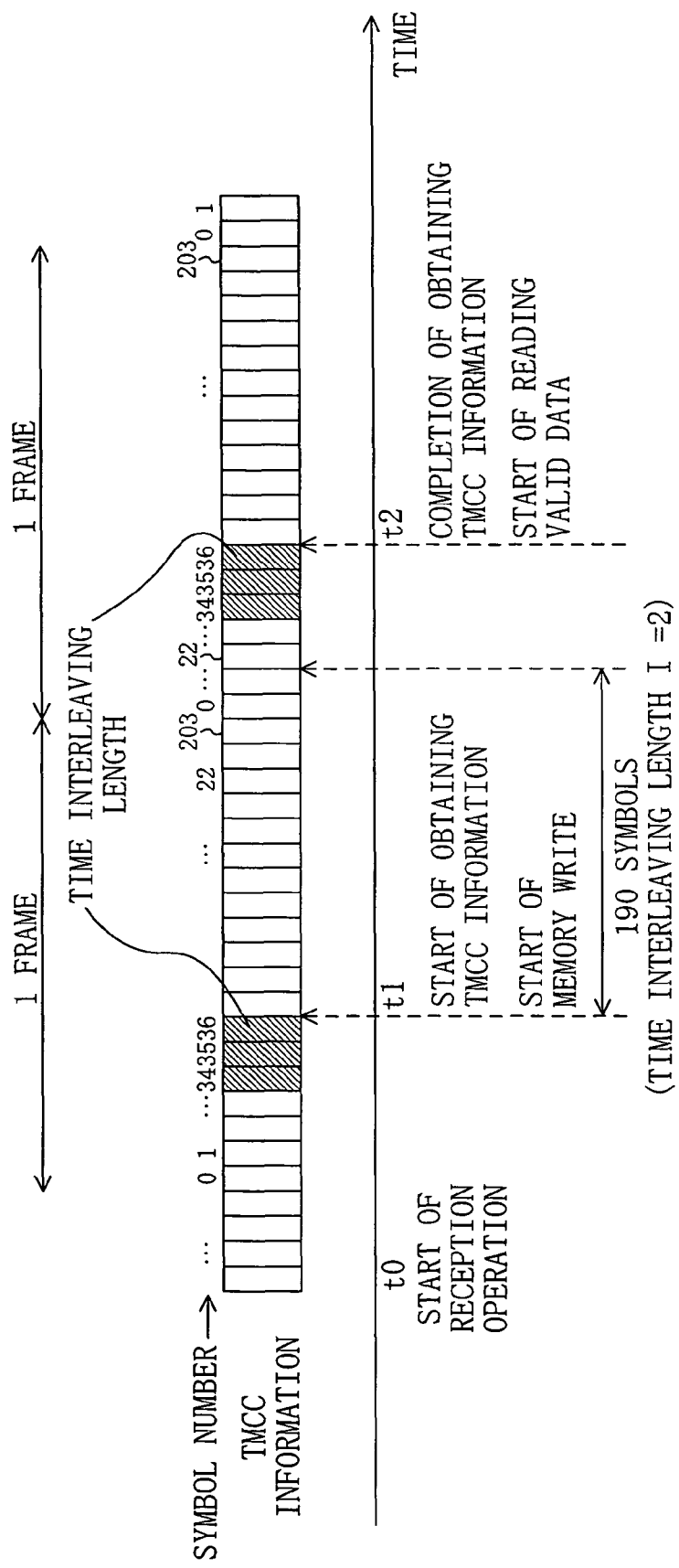
FIG. 23 is a timing chart illustrating a relationship between a state of obtaining of TMCC information and timing of resetting time deinterleaving when time interleaving is started without waiting for completion of the obtaining of TMCC information.

FIG. 22 is a timing chart illustrating a relationship between a state of obtaining of TMCC information and timing of resetting time deinterleaving when time interleaving is started after completion of the obtaining of TMCC information. FIG. 23 is a timing chart illustrating a relationship between a state of obtaining of TMCC information and timing of resetting time deinterleaving when time interleaving is started without waiting for completion of the obtaining of TMCC information.

In ISDB-T, in order to improve characteristics during mobile reception, time interleaving is adopted in which a delay amount of data is shifted in units of a symbol for each carrier in a transmitter, and the data is shifted back to the original state in a receiver, so that concentrated errors occurring on a transmission channel are dispersed. A time interleaving length I indicating the dispersion period can be arbitrarily selected from I=0, 1, 2, and 4 (when Mode is 3), depending on the contents of a service, in the transmitter. The data dispersion period due to time interleaving is 0 symbol when I=0, 95 symbols when I=1, 190 symbols when I=2, and 380 symbols when I=4. TMCC information about the time interleaving length is transmitted using TMCC carriers in symbols having symbol numbers 34, 35 and 36 (in the case of a time interleaving length in the hierarchical layer A).

It is now assumed that a reception operation is started at time t0, obtaining of TMCC information about a time interleaving length is started at time t1 and is completed at time t2. Also, it is assumed that time t1 is time of symbol number 37 of a certain frame, and time t2 is time of symbol number 37 of the next frame. The time interleaving length I of an OFDM signal to be received is assumed to be 2 (dispersion period: 190 symbols). When the time interleaving length I=2, it is necessary to write data corresponding to 190 symbols in a memory. Therefore, valid data is read out only after a period corresponding to 190 symbols has passed since the start of write.

As illustrated in FIG. 22, if write is started into a memory at time t2 when the obtaining of a time interleaving length is completed, valid data can be read out from the memory at time t3 which is a period of 190 symbols after time t2 (timing of symbol number 22), and from this time, a time-deinterleaved OFDM signal can be output.

On the other hand, as illustrated in FIG. 23, the case where write into a memory is started before completion of a time interleaving length, i.e., for example, the case where write into a memory is started at time t1 when the obtaining of a time interleaving length is started, will be discussed. During a period from time t1 to t2, the time interleaving length is unclear, so that a valid signal cannot be output. However, at time t2, since a period of 190 symbols or more has passed since the start of write, a time-deinterleaved OFDM signal can be output immediately after the obtaining of a time interleaving length is completed. In other words, as compared to the case of FIG. 22, a time-deinterleaved OFDM signal is obtained earlier by a period of 190 symbols.

Therefore, in the time deinterleaving section 734 of this embodiment, write of an OFDM signal to the memory 739 is started before obtaining a time interleaving length in the transmission control information obtaining section 46, and read corresponding to the time interleaving length of the memory 739 is started at the time when the obtaining of a time interleaving length is completed. Here, when write of an OFDM signal into the memory 739 is performed, write may be performed, assuming a maximum time interleaving length.

As a result, as compared to the case when a time interleaving length is obtained before write corresponding to the interleaving length is started, a time-deinterleaved OFDM signal can be output at an early stage. Therefore, it is possible to shorten the time from the start of reception to the output of video, audio or the like.

Although this embodiment has been described, for the sake of convenience, assuming that the frequency deinterleaving section 32 and the time deinterleaving section 734 are separate parts, since both of them perform an interleaving process in units of a carrier, they may be integrated together, thereby making it possible to reduce the amount of a memory. Specifically, the following deinterleaving section may be used instead of the deinterleaving section 730.

Figure 24:
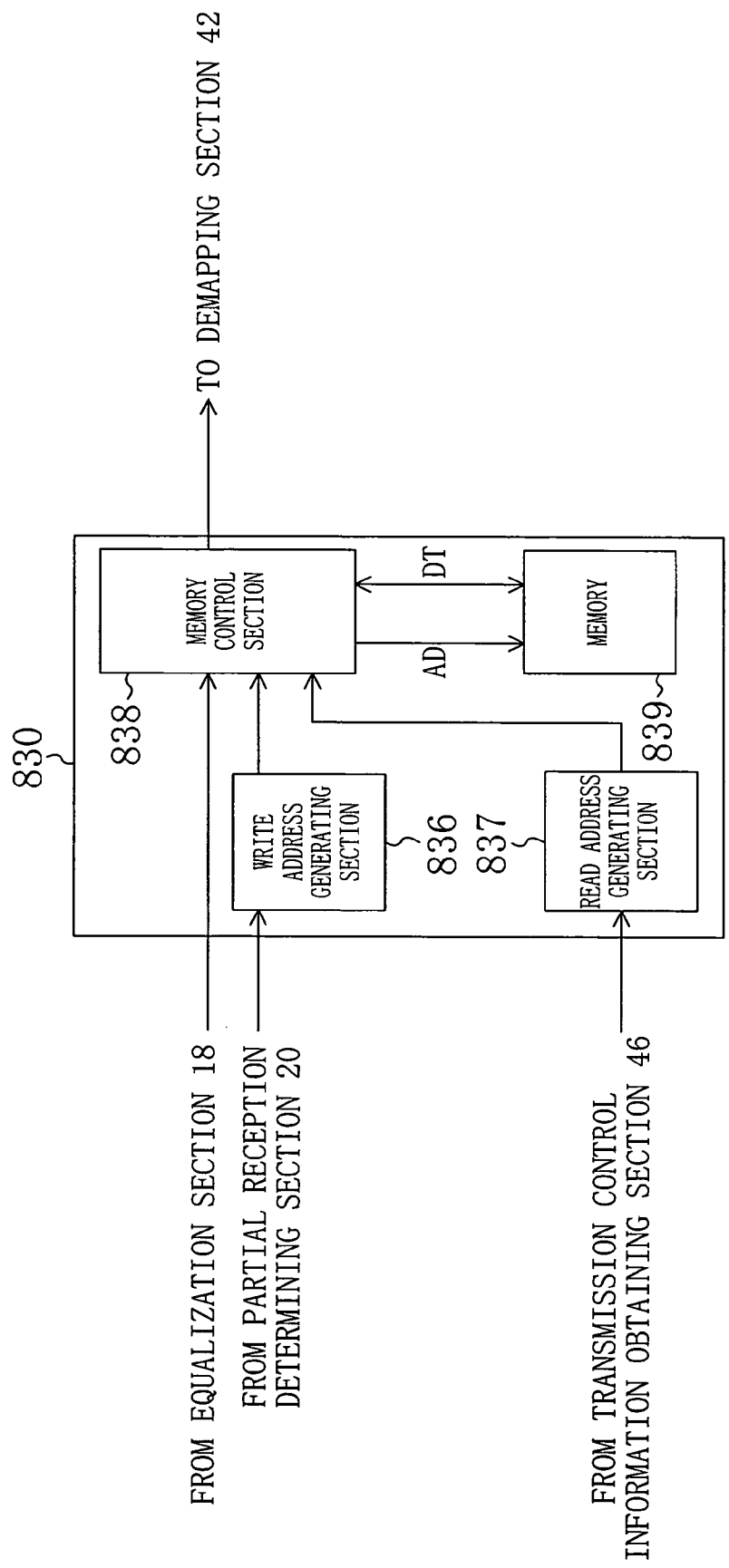
FIG. 24 is a block diagram illustrating a configuration of a variation of a deinterleaving section of FIG. 21.
Figure 25:
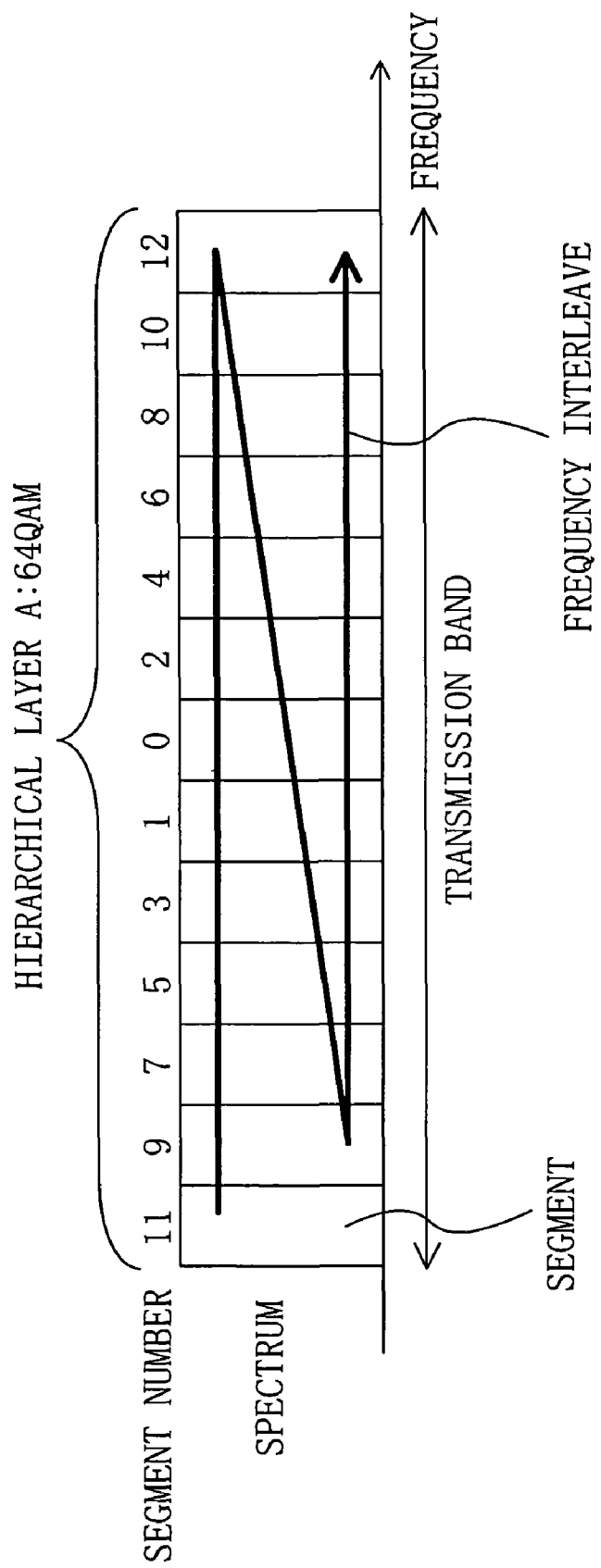
FIG. 25 is a schematic diagram illustrating frequency interleaving of an OFDM signal when single-hierarchical layer transmission is performed.
Figure 26:
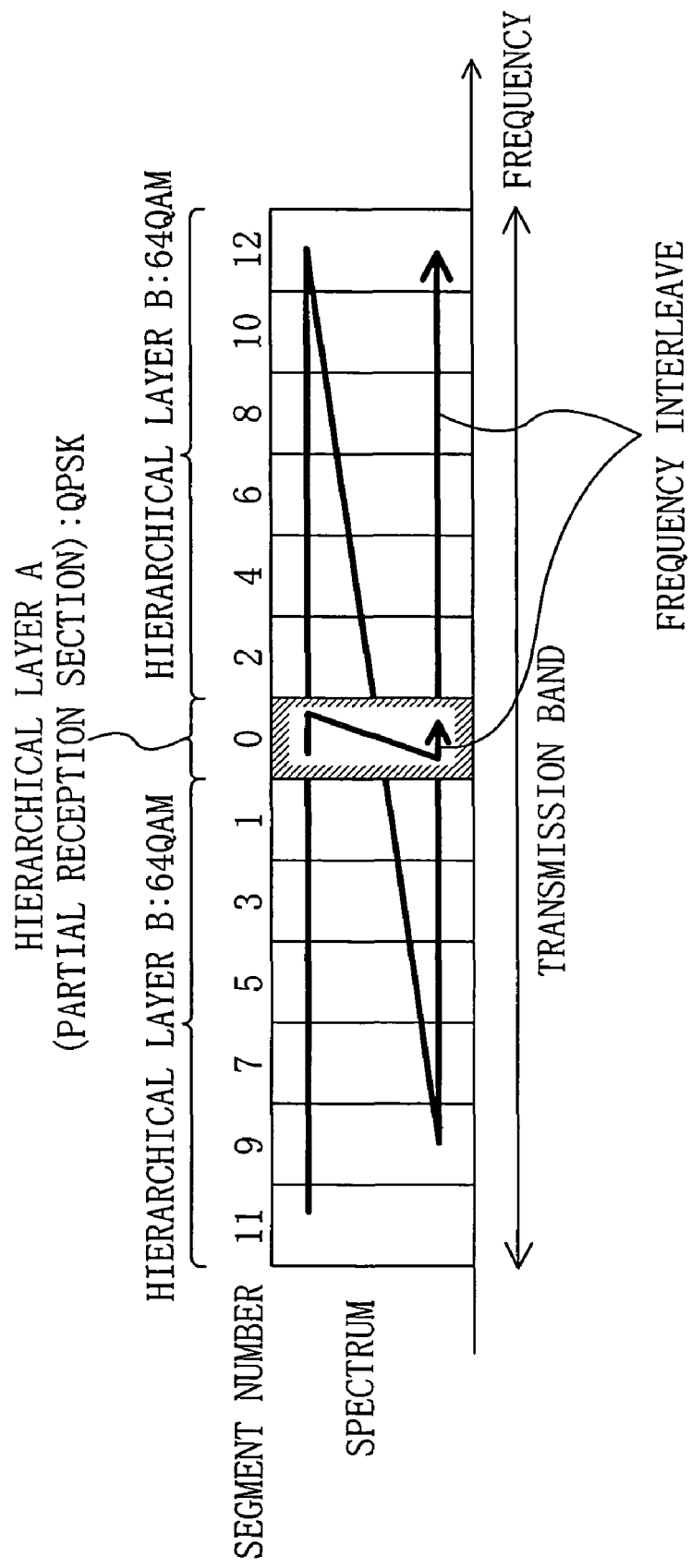
FIG. 26 is a schematic diagram illustrating frequency interleaving of an OFDM signal when two-hierarchical layer transmission for partial reception is performed.
Figure 27:
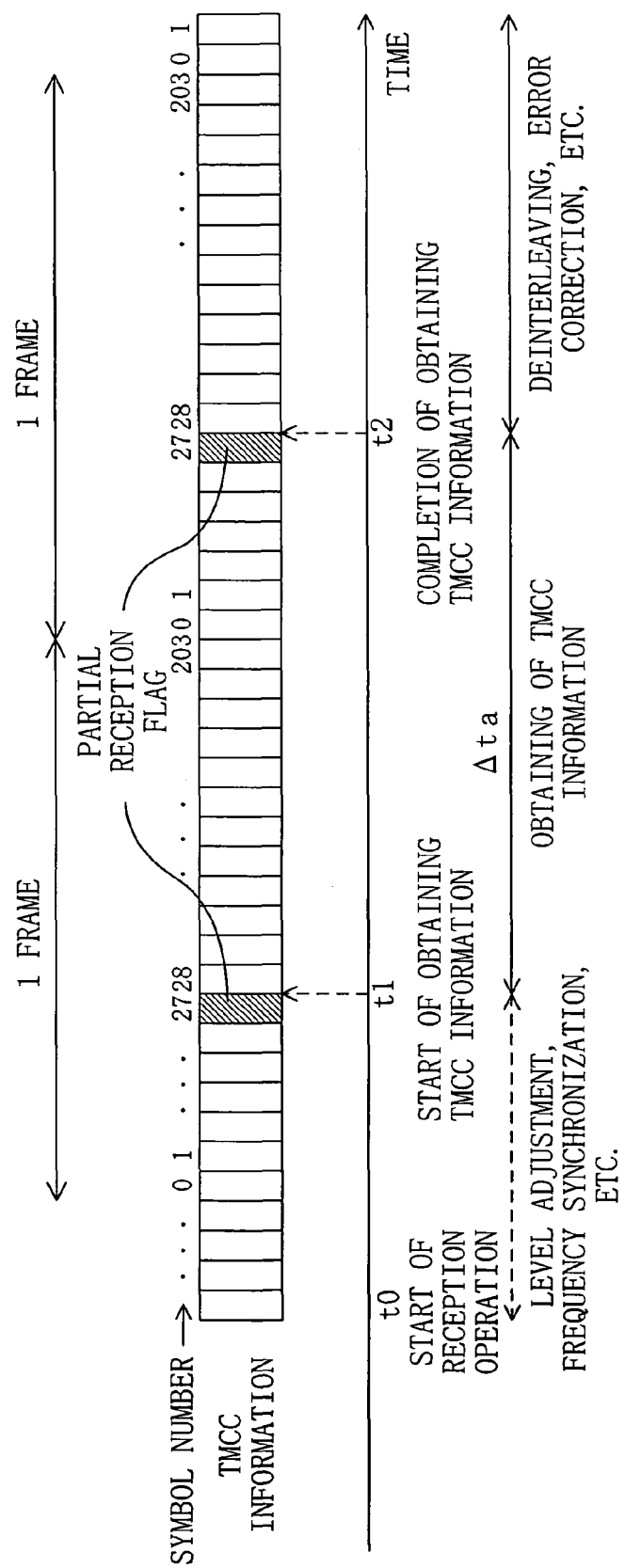
FIG. 27 is a diagram for explaining timing with which TMCC information is obtained.

FIG. 24 is a block diagram illustrating a configuration of a variation of the deinterleaving section of FIG. 21. The deinterleaving section 830 of FIG. 24 has a write address generating section 836, a read address generating section 837, a memory control section 838, and a memory 839.

The write address generating section 836 and the read address generating section 837 of FIG. 24 generates respective addresses so as to simultaneously reset frequency interleaving and time interleaving. In this case, the write address generating section 836 generates a write address based on the result of determination of the presence or absence of a partial reception portion which is obtained from the partial reception determining section 20. The read address generating section 837 generates a read address based on a time interleaving length obtained by the transmission control information obtaining section 46.

The memory control section 838 outputs the write address and the read address supplied from the write address generating section 836 and the read address generating section 837, respectively, as addresses AD to the memory 839. Also, the memory control section 838 controls write of an OFDM signal supplied to the deinterleaving section 830 as data DT to the memory 839 in accordance with the write address, and controls read of data DT from the memory 839 in accordance with the read address, and outputs the read data as a frequency-deinterleaved and time-deinterleaved OFDM signal to the demapping section 42.

The memory control section 838 starts writing OFMD signal data to the memory 839 before obtaining a time interleaving length, based on the result of determination of the presence or absence of a partial reception portion which is obtained from the partial reception determining section 20, and from the time when the obtaining of a time interleaving length is completed, data may be read out from the memory, depending on the time interleaving length. Also in this case, as is similar to the deinterleaving section 730 of FIG. 21, a frequency-deinterleaved and time-deinterleaved OFDM signal can be obtained at an early stage.

Also, in this embodiment, the partial reception determining section 220 of FIG. 16 may be used instead of the partial reception determining section 20.

Also, regarding this embodiment, as has been described with reference to FIG. 17 and the like, a selection section may be provided so that the deinterleaving section 730 may appropriately select and use information about the presence or absence of a partial reception portion which is obtained in the partial reception determining section 20 and information obtained from TMCC information.

Although the above embodiments have been described mainly using vectors and their components, the vector may be a position vector having a start point at the origin O, and the end point of the vector and the I-axis coordinate and the Q-axis coordinate of the end point may be used, and in this case, the embodiments can be similarly described.

The first to seventh embodiments illustrate configurations of the present invention, and the present invention is not limited to the configurations described in those embodiments. For example, the sequence of the signal process may be changed, signal processes performed by a plurality of parts may be integrated together or may be combined with other signal processes, or a portion of the signal processes may be removed. The illustrated configurations do not limit the subject matter of the present invention.

INDUSTRIAL APPLICABILITY

As described above, the present invention can significantly shorten the time from the start of reception operation to the output of video, audio or the like, and therefore, is useful as an OFDM reception apparatus, an OFDM reception method, and the like.

The invention claimed is:

1. An OFDM reception apparatus for receiving an OFDM (Orthogonal Frequency Division Multiplexing) signal constituted by a plurality of carriers, comprising:
   a fast Fourier transform section for converting a received time-domain OFDM signal into a frequency-domain OFDM signal;
   an equalization section for performing waveform equalization with respect to the frequency-domain OFDM signal, and outputting a waveform-equalized OFDM signal; and
   a modulation scheme estimating section for estimating a modulation scheme, among candidate modulation schemes, for the carriers based on signal points of carriers constituting the waveform-equalized OFDM signal, and outputting an obtained estimation result,
   wherein the received OFDM signal is subjected to a process for obtaining transmitted information, depending on the estimation result,
   the modulation scheme estimating section calculates an average value of I-axis coordinates and an average value of Q-axis coordinates of signal points in a predetermined region corresponding to one of the candidate modulation schemes on an I-Q plane among the signal points, and determines whether the modulation scheme for the carriers is the one of the candidate modulation schemes based on the calculated I-axis coordinate average value and Q-axis coordinate average value.

2. The OFDM reception apparatus of claim 1, further comprising:
   a demapping section for performing soft decision with respect to the waveform-equalized OFDM signal based on the estimation result obtained in the modulation scheme estimating section.

3. An OFDM reception apparatus for receiving an OFDM (Orthogonal Frequency Division Multiplexing) signal constituted by a plurality of carriers, comprising:
   a fast Fourier transform section for converting a received time-domain OFDM signal into a frequency-domain OFDM signal;
   an equalization section for performing waveform equalization with respect to the frequency-domain OFDM signal, and outputting a waveform-equalized OFDM signal; and
   a modulation scheme estimating section for estimating a modulation scheme, among candidate modulation schemes, for the carriers based on signal points of carriers constituting the waveform-equalized OFDM signal, and outputting an obtained estimation result,
   wherein the received OFDM signal is subjected to a process for obtaining transmitted information, depending on the estimation result,
   the received OFDM signal contains a plurality of segments each constituted by a plurality of carriers, and information for partial reception can be transmitted using a predetermined segment, and
   the OFDM reception apparatus further comprises:
   a determination section for determining whether or not the information for partial reception is transmitted in the received OFDM signal, based on the estimation result obtained in the modulation scheme estimating section; and
   a deinterleaving section for resetting frequency interleaving with respect to the received OFDM signal, depending on a determination result obtained by the determination section.

4. The OFDM reception apparatus of claim 3, wherein
based on the estimation result obtained in the modulation scheme estimating section, the determination section determines that the information for partial reception is transmitted in the received OFDM signal when a modulation scheme for a plurality of carriers belonging to the predetermined segment in which the information for partial reception can be transmitted is QPSK (Quaternary Phase Shift Keying) or 16QAM (Quadrature Amplitude Modulation), and that the information for partial reception is not transmitted in the received OFDM signal when a modulation scheme for a plurality of carriers belonging to the predetermined segment in which the information for partial reception can be transmitted is 64QAM.

5. The OFDM reception apparatus of claim 3, wherein
based on the estimation result obtained in the modulation scheme estimating section, the determination section determines that the information for partial reception is transmitted in the received OFDM signal when a modulation scheme for a plurality of carriers belonging to the predetermined segment in which the information for partial reception can be transmitted, is different from a modulation scheme for a plurality of carriers belonging to a segment different from the predetermined segment in which the information for partial reception can be transmitted, and when otherwise, that the information for partial reception is not transmitted in the received OFDM signal.

6. The OFDM reception apparatus of claim 3, further comprising:
a transmission control information obtaining section for obtaining and outputting transmission control information indicating whether or not the information for partial reception is transmitted in the received OFDM signal, from the frequency-domain OFDM signal; and
a selection section for, when the transmission control information obtaining section has obtained the transmission control information, selecting the transmission control information output by the transmission control information obtaining section, and when otherwise, selecting the determination result obtained by the determination section, and outputting a selection result to the deinterleaving section,
wherein the deinterleaving section resets frequency interleaving with respect to the received OFDM signal based on an output of the selection section.

7. The OFDM reception apparatus of claim 3, further comprising:
a demapping section for performing soft decision with respect to the waveform-equalized OFDM signal based on the estimation result obtained in the modulation scheme estimating section, and outputting an obtained result.

8. The OFDM reception apparatus of claim 3, further comprising:
a transmission control information obtaining section for obtaining and outputting transmission control information indicating a time interleaving length of the received OFDM signal from the frequency-domain OFDM signal,
wherein the deinterleaving section generates a write address based on the determination result of the determination section before obtaining the transmission control information indicating the time interleaving length in the transmission control information obtaining section, and based on the generated write address, starts writing the received OFDM signal into a memory, and after obtaining the transmission control information indicating the time interleaving length in the transmission control information obtaining section, generates a read address based on the obtained time interleaving length, reads out the OFDM signal written in the memory based on the generated read address, and resets frequency interleaving and time interleaving which have been performed with respect to the received OFDM signal.

9. An OFDM reception aratus for receiving an OFDM (Orthogonal Frequency Division Multiplexing) signal constituted by a plurality of carriers, comprising:
a fast Fourier transform section for converting a received time-domain OFDM signal into a frequency-domain OFDM signal;
an equalization section for performing waveform equalization with respect to the frequency-domain OFDM signal, and outputting a waveform-equalized OFDM signal;
a modulation scheme estimating section for estimating a modulation scheme, among candidate modulation schemes, for the carriers based on signal points of carriers constituting the waveform-equalized OFDM signal, and outputting an obtained estimation result; and
a demapping section for performing soft decision with respect to the waveform-equalized OFDM signal based on the estimation result obtained in the modulation scheme estimating section,
a transmission control information obtaining section for obtaining and outputting transmission control information indicating a modulation scheme for a carrier of the received OFDM signal from the frequency-domain OFDM signal; and
a selection section for, when the transmission control information obtaining section has obtained the transmission control information, selecting the transmission control information output by the transmission control information obtaining section, and when otherwise, selecting the estimation result output by the modulation scheme estimating section, and outputting a selection result to the demapping section,
wherein
the received OFDM signal is subjected to a process for obtaining transmitted information, depending on the estimation result,
the demapping section performs soft decision with respect to the waveform-equalized OFDM signal based on an output of the selection section.

10. A reception apparatus comprising:
an equalization section for receiving a digitally modulated carrier, and performing waveform equalization with respect to the carrier;
a modulation scheme estimating section for calculating a time-average value of I-axis coordinates and a time-average value of Q-axis coordinates of signal points in a predetermined region corresponding to one of the candidate modulation schemes on an I-Q plane among signal points of the carrier waveform-equalized by the equalization section, and based on the calculated I-axis and Q-axis values determining whether the modulation scheme for the carrier is the one of the candidate modulation schemes; and
a demapping section for performing soft decision with respect to the carrier waveform-equalized by the equalization section, based on the modulation scheme estimated by the modulation scheme estimating section, and outputting an obtained result.

11. An OFDM reception method for receiving an OFDM signal constituted by a plurality of carriers, comprising:
a fast Fourier transform step of converting a received time-domain OFDM signal into a frequency-domain OFDM signal;
an equalization step of performing waveform equalization with respect to the frequency-domain OFDM signal, and outputting the waveform-equalized OFDM signal;
a modulation scheme estimating step of estimating a modulation scheme, among candidate modulation schemes, for the carriers based on signal points of carriers constituting the waveform-equalized OFDM signal to obtain an estimation result; and a step of performing a process for obtaining transmitted information with respect to the received OFDM signal, depending on the estimation result, wherein the modulation scheme estimating step calculates an average value of I-axis coordinates and an average value of Q-axis coordinates of signal points in a predetermined region corresponding to one of the candidate modulation schemes on an I-Q plane among the signal points, and determines whether the modulation scheme for the carriers is the one of the candidate modulation schemes based on the calculated I-axis coordinate average value and Q-axis coordinate average value.

12. The OFDM reception method of claim 11, further comprising:

a demapping step of performing soft decision with respect to the waveform-equalized OFDM signal based on the estimation result obtained in the modulation scheme estimating step.

13. An OFDM reception method for receiving an OFDM signal constituted by a plurality of carriers, comprising:

a fast Fourier transform step of converting a received time-domain OFDM signal into a frequency-domain OFDM signal;

an equalization step of performing waveform equalization with respect to the frequency-domain OFDM signal, and outputting the waveform-equalized OFDM signal;

a modulation scheme estimating step of estimating a modulation scheme, among candidate modulation schemes, for the carriers based on signal points of carriers constituting the waveform-equalized OFDM signal to obtain an estimation result; and a step of performing a process for obtaining transmitted information with respect to the received OFDM signal, depending on the estimation result, wherein the received OFDM signal contains a plurality of segments each constituted by a plurality of carriers, and information for partial reception can be transmitted using a predetermined segment, and the OFDM reception method further comprises:

a determination step of determining whether or not the information for partial reception is transmitted in the received OFDM signal, based on the estimation result obtained in the modulation scheme estimating step; and a deinterleaving step of resetting frequency interleaving with respect to the received OFDM signal, depending on a determination result obtained by the determination step.

14. The OFDM reception method of claim 13, wherein based on the estimation result obtained in the modulation scheme estimating step, the determination step determines that the information for partial reception is transmitted in the received OFDM signal when a modulation scheme for a plurality of carriers belonging to the predetermined segment in which the information for partial reception can be transmitted, is different from a modulation scheme for a plurality of carriers belonging to a segment different from the predetermined segment in which the information for partial reception can be transmitted, and when otherwise, that the information for partial reception is not transmitted in the received OFDM signal.

\* \* \* \* \*